(12) United States Patent
Kinoshita et al.

(10) Patent No.: US 7,283,739 B2
(45) Date of Patent: *Oct. 16, 2007

(54) MULTIPLE SUBNETS IN AN OPTICAL RING NETWORK AND METHOD

(75) Inventors: Susumu Kinoshita, Plano, TX (US); Koji Takeguchi, Richardson, TX (US); Ashwin Anil Gumaste, Richardson, TX (US)

(73) Assignee: Fujitsu Limited, Kawasaki (JP)

( * ) Notice: Subject to any disclaimer, the term of this patent is extended or adjusted under 35 U.S.C. 154(b) by 733 days.

This patent is subject to a terminal disclaimer.

(21) Appl. No.: 10/158,348

(22) Filed: May 29, 2002

(65) Prior Publication Data

US 2004/0208574 A1  Oct. 21, 2004

(51) Int. Cl.
G02F 1/00 (2006.01)

(52) U.S. Cl. .............................. 398/3; 398/59; 398/79; 398/82; 398/83; 398/4; 398/5; 398/7; 398/10; 398/13; 398/14; 398/17; 398/20; 398/22; 398/23; 398/24; 398/30; 398/33; 398/45; 398/50; 398/56; 370/216; 370/217; 370/221; 370/222; 370/223; 370/224; 370/225; 370/227; 370/228

(58) Field of Classification Search .......... 398/59, 398/79, 83, 45, 50, 56, 3, 5, 30, 82, 4, 7, 398/10, 13, 14, 17, 20, 22, 23, 24, 33, 1, 398/2, 34, 48, 49; 370/216, 217, 221, 222, 370/225, 227, 228, 223, 224

See application file for complete search history.

(56) References Cited

U.S. PATENT DOCUMENTS

| | | | |
|---|---|---|---|
| 5,179,548 A * | 1/1993 | Sandesara | 370/222 |
| 5,327,427 A * | 7/1994 | Sandesara | 370/222 |
| 5,414,548 A | 5/1995 | Tachikawa et al. | 359/130 |
| 5,576,875 A | 11/1996 | Chawki et al. | 359/125 |

(Continued)

FOREIGN PATENT DOCUMENTS

EP 0 677 935 A1 4/1995

(Continued)

OTHER PUBLICATIONS

Kinoshita et al., "Flexible Twin Open Ring Metro WDM Network," OECC, pp. 713-714, Oct. 2003.

(Continued)

Primary Examiner—Hanh Phan
(74) Attorney, Agent, or Firm—Baker Botts L.L.P.

(57) ABSTRACT

An optical network includes an optical ring and at least three subnets. Each subnet includes a plurality of add/drop nodes coupled to the optical ring. The add/drop nodes are operable to passively add a first traffic stream in a first direction on the optical ring and a second traffic stream in a second direction on the optical ring. The first traffic stream comprises different content than the second traffic stream, and the first traffic stream and the second traffic stream are transmitted on the same wavelength. The network also includes a plurality of gateway nodes. The gateway nodes are each coupled to the optical ring at a boundary between neighboring subnets and are operable to selectively pass and terminate wavelengths between subnets to allow wavelength reuse in the subnets.

34 Claims, 22 Drawing Sheets

U.S. PATENT DOCUMENTS

| | | | | |
|---|---|---|---|---|
| 5,615,036 | A | 3/1997 | Emura | 359/124 |
| 5,771,112 | A | 6/1998 | Hamel et al. | 359/128 |
| 5,774,244 | A | 6/1998 | Tandon et al. | 359/125 |
| 5,778,118 | A | 7/1998 | Sridhar | 385/24 |
| 5,903,371 | A | 5/1999 | Arecco et al. | 359/119 |
| 5,930,016 | A | 7/1999 | Brorson et al. | 359/127 |
| 6,097,696 | A | 8/2000 | Doverspike | 370/216 |
| 6,122,096 | A | 9/2000 | Fatehi | 359/341 |
| 6,137,608 | A | 10/2000 | White | 359/128 |
| 6,160,648 | A | 12/2000 | Öberg et al. | 359/110 |
| 6,192,173 | B1 | 2/2001 | Solheim et al. | 385/24 |
| 6,236,498 | B1 | 5/2001 | Freeman et al. | 359/341 |
| 6,295,146 | B1 | 9/2001 | Nathan et al. | 359/119 |
| 6,310,994 | B1 | 10/2001 | Jones et al. | 385/24 |
| 6,331,906 | B1 | 12/2001 | Sharma et al. | 359/119 |
| 6,344,911 | B1 | 2/2002 | Dailey, Jr. et al. | 359/127 |
| 6,351,582 | B1 | 2/2002 | Dyket et al. | 385/24 |
| 6,400,859 | B1 | 6/2002 | de Boer et al. | |
| 6,426,817 | B1 | 7/2002 | Tomita | 359/127 |
| 6,456,406 | B1 | 9/2002 | Arecco et al. | 359/119 |
| 6,456,407 | B1 | 9/2002 | Tammela et al. | 359/119 |
| 6,486,988 | B1 | 11/2002 | Lewis et al. | 359/127 |
| 6,525,852 | B1* | 2/2003 | Egnell | 398/83 |
| 6,580,549 | B1 | 6/2003 | Kinoshita | |
| 6,590,681 | B1* | 7/2003 | Egnell et al. | 398/82 |
| 6,616,349 | B1* | 9/2003 | Li et al. | 398/4 |
| 6,631,018 | B1* | 10/2003 | Milton et al. | 398/59 |
| 6,658,013 | B1* | 12/2003 | de Boer et al. | 370/404 |
| 6,701,085 | B1 | 3/2004 | Muller | |
| 6,895,184 | B2* | 5/2005 | Way | 398/59 |
| 2001/0015836 | A1 | 8/2001 | Kim et al. | 359/124 |
| 2001/0040710 | A1 | 11/2001 | Sharratt et al. | 359/119 |
| 2001/0050790 | A1 | 12/2001 | Graves et al. | 359/110 |
| 2002/0003639 | A1* | 1/2002 | Arecco et al. | 359/119 |
| 2002/0030869 | A1 | 3/2002 | Okazaki et al. | 359/128 |
| 2002/0044315 | A1 | 4/2002 | Sugawara et al. | |
| 2002/0067523 | A1 | 6/2002 | Way | 359/119 |
| 2002/0101633 | A1 | 8/2002 | Onaka et al. | 359/119 |
| 2002/0126334 | A1 | 9/2002 | Milton et al. | 359/110 |
| 2002/0131118 | A1 | 9/2002 | Chiaroni et al. | |
| 2002/0145779 | A1 | 10/2002 | Strasser et al. | 359/124 |
| 2002/0149817 | A1 | 10/2002 | Kiliccote et al. | 359/119 |
| 2002/0186432 | A1 | 12/2002 | Roorda et al. | |
| 2002/0186439 | A1 | 12/2002 | Buabbud et al. | 359/173 |
| 2002/0191898 | A1 | 12/2002 | Evans et al. | 385/24 |
| 2002/0196491 | A1 | 12/2002 | Deng et al. | 359/124 |
| 2003/0170020 | A1 | 9/2003 | Chaudhuri et al. | |
| 2004/0208575 | A1 | 10/2004 | Takegushi et al. | |
| 2005/0111495 | A1* | 5/2005 | Gumaste et al. | 370/535 |

FOREIGN PATENT DOCUMENTS

| | | |
|---|---|---|
| EP | 0 668 674 | 8/1995 |
| EP | 0 716 521 A2 | 6/1996 |
| EP | 0 907 266 A2 | 4/1999 |
| EP | 1 161 014 A1 | 12/2001 |
| EP | 1 265 451 | 12/2002 |
| EP | 1 564 933 | 8/2005 |
| GB | 2 359 433 | 8/2001 |
| JP | 402141133 | 5/1990 |
| WO | WO96/32787 | 10/1996 |
| WO | WO98/52314 | 11/1998 |
| WO | WO99/03231 | 1/1999 |
| WO | WO99/65164 | 12/1999 |
| WO | WO 03/104849 | 12/2003 |
| WO | WO 03/104849 A2 | 12/2003 |
| WO | WO 2004/107617 | 12/2004 |

OTHER PUBLICATIONS

Tian et al., "OUPSR Protected Flexible Metro WDM Network," ECOC, pp. 826-827, 2003.

Boskovic, et al., "Broadcast and Select OADM nodes Application and Performance Trade-offs," OFC, pp. 158-159, 2002.

Kai et al., "Photonic Gateway with µs-Order Wavelength Path Control for Metro Access Networks," ECOC, pp. 512-513, 2003.

Bacque, B. et al., "R-OADM Architecture—Now you can Control the Light," Tropic Networks, pp. 1-11, 2003.

U.S. Appl. No. 10/108,734, entitled "Method and System for Control Signaling in an Open Ring Optical Network," filed Mar. 27, 2002.

U.S. Appl. No. 10/108,741, entitled "Method and System for Testing During Operation of an Open Ring Optical Network," filed Mar. 27, 2002.

U.S. Appl. No. 10/112,022, entitled "Flexible Open Ring Optical Network and Method," filed Mar. 28, 2002.

U.S. Appl. No. 10/158,523, entitled "Optical Ring Network with Optical Subnets and Method," filed May 29, 2002.

Imrich Chlamtac et al., "Lightpath Communications: An Approach to High Bandwidth Optical WAN's," *IEEE Transactions on Communications*, vol. 40, No. 7, Jul. 1992, 12 pages.

Aradhana Narula-Tam et al., "Efficient Routing and Wavelength Assignment for Reconfigurable WDM Networks," *IEEE Journal on Selected Areas in Communications*, vol. 20, No. 1, Jan. 2002, 14 pages.

Grenfeldt,"ERION-Ericsson optical networking using WDM technology," Ericsson Review No. 3, pp. 132-137, 1998.

Ashmead, "ROADMap for the Metro Market," Fiberoptic Product News, 3 pages (36,38, and 40), Oct. 2001.

Batchellor, "Optical Networking the Ericsson Way," Ericsson Limited, Business Unit Transport and Cable Networks, pp. 1-4, Feb. 22, 2002.

Kinoshita et al., "Flexible Twin Open Ring Metro WDM Network," OECC, pp. 713-714, Oct. 2003.

Tian et al., "OUPSR Protected Flexible Metro WDM Network," ECOC, pp. 826-827, 2003.

Boskovic et al., "Broadcast and Select OADM Nodes Application and Performance Trade-offs," OFC, pp. 158-159, 2002.

Kinoshita et al. "Flexible Metro WDM Network with Photonic Domains", Fujitsu Laboratories of America, Inc., 3 pages, Feb. 24-26, 2004.

Suzuki et al., "Prototype of 12.5GHz-Spaced Tapped-Type OADM for DWDM Metro Ring Networks," ECOC-IOOC Proceedings—vol. 4, pp. 902-903, Sep. 21-25, 2003.

Wolde, J., et al., "Optical Ethernet Metro Access Network Protype: Implementation and Results," ECOC-IOOC 2003, 3 pages, Sep. 21-25, 2003.

Toba, H., et al., "Demonstration of Optical FDM Based Self-Healing Ring Network Employing Arrayed-Waveguide-Granting ADM Filters and EDFAs," NTT Transmission Systems Laboratories, pp. 263-266, Sep. 24, 1994.

Notification of Transmittal of the International Search Report or the Declaration (PCT Rule 44.1) mailed Mar. 17, 2004 (9 pages) re International Application No. PCT/US 03/16193.

Communication from the European Patent Office, European Search Report for Application No. EP 05 00 1571, Jun. 17, 2005, 3 pages.

Communication from the European Patent Office, European Search Report for Application No. EP 05 01 3846, Oct. 18, 2005, 4 pages.

Notification of Transmittal of the International Search Report or the Declaration (PCT Rule 44.1) mailed Oct. 28, 2004 (5 pages) re International Application No. PCT/US 2004/016352.

Communication from the European Patent Office, European Search Report for Application No. EP 04 02 6005, May 3, 2006, 3 pages.

Gumaste et al., "Benefits of Optical Subnets in WDM Ring Networks," First International Conference on Optical Communications and Networks, Nov. 11-14, 2002, World Scientific Singapore, p. 99-103.

Takeguchi et al., Bifurcated Traffic and Channel Assignment (BITCA) to Interconnect Metro Rings, Tuesday Morning, OFC 2002, Mar. 19, 2002, pp. 39-41.

* cited by examiner

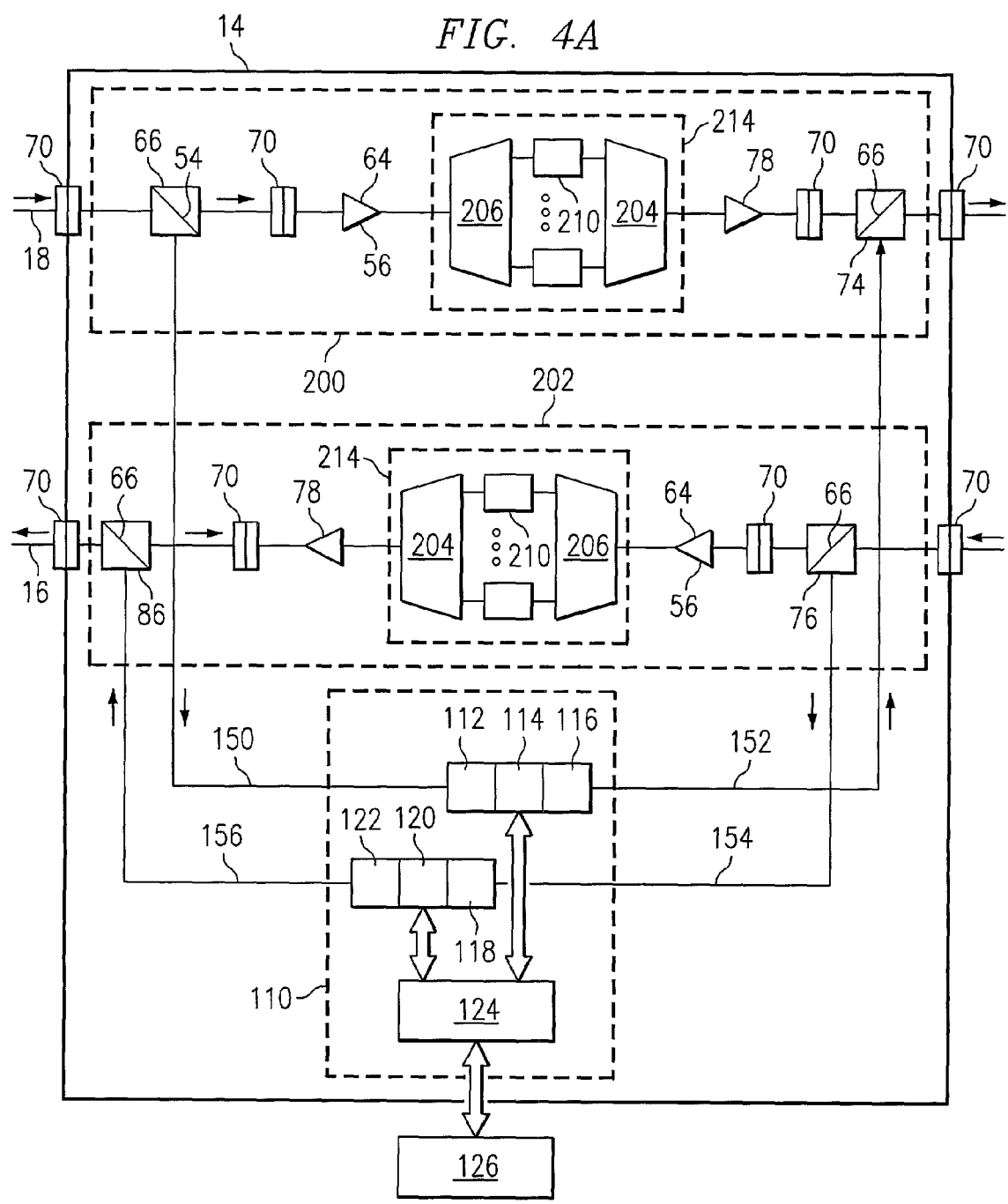

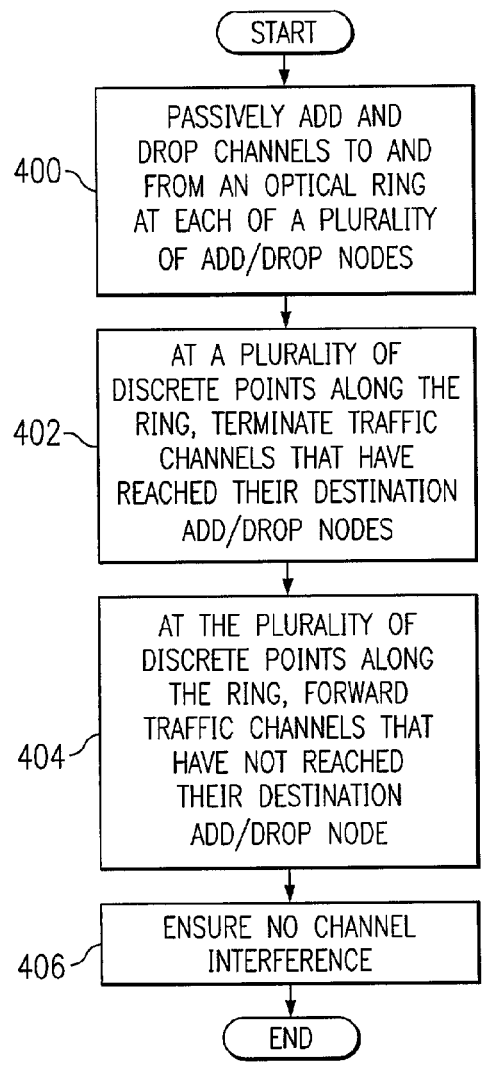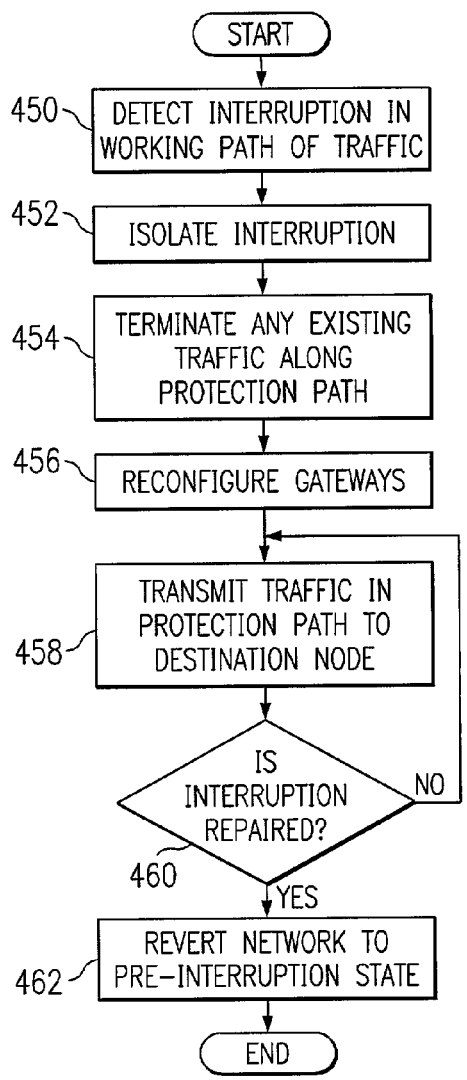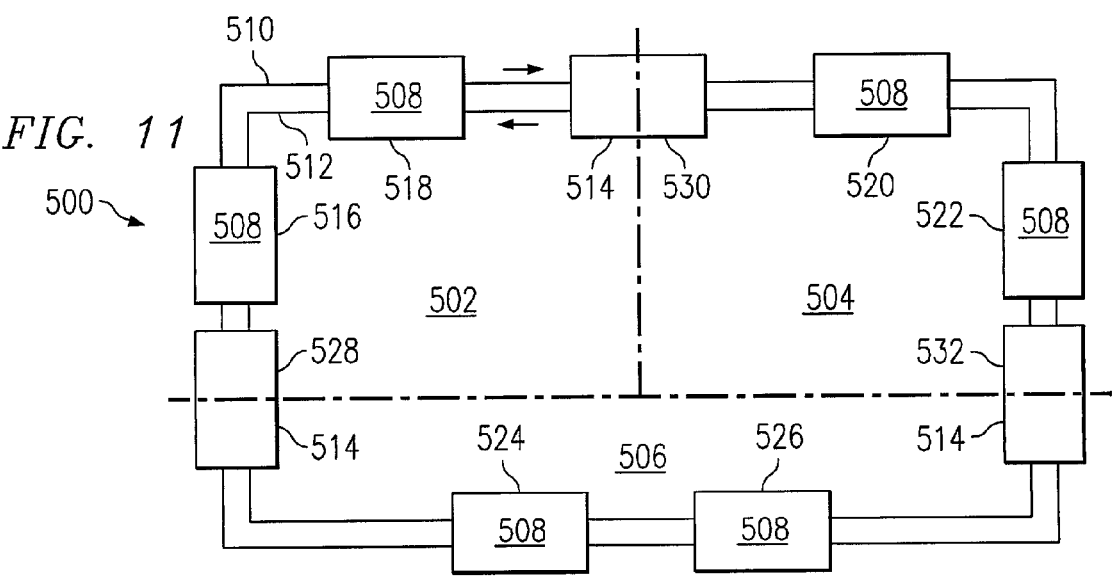

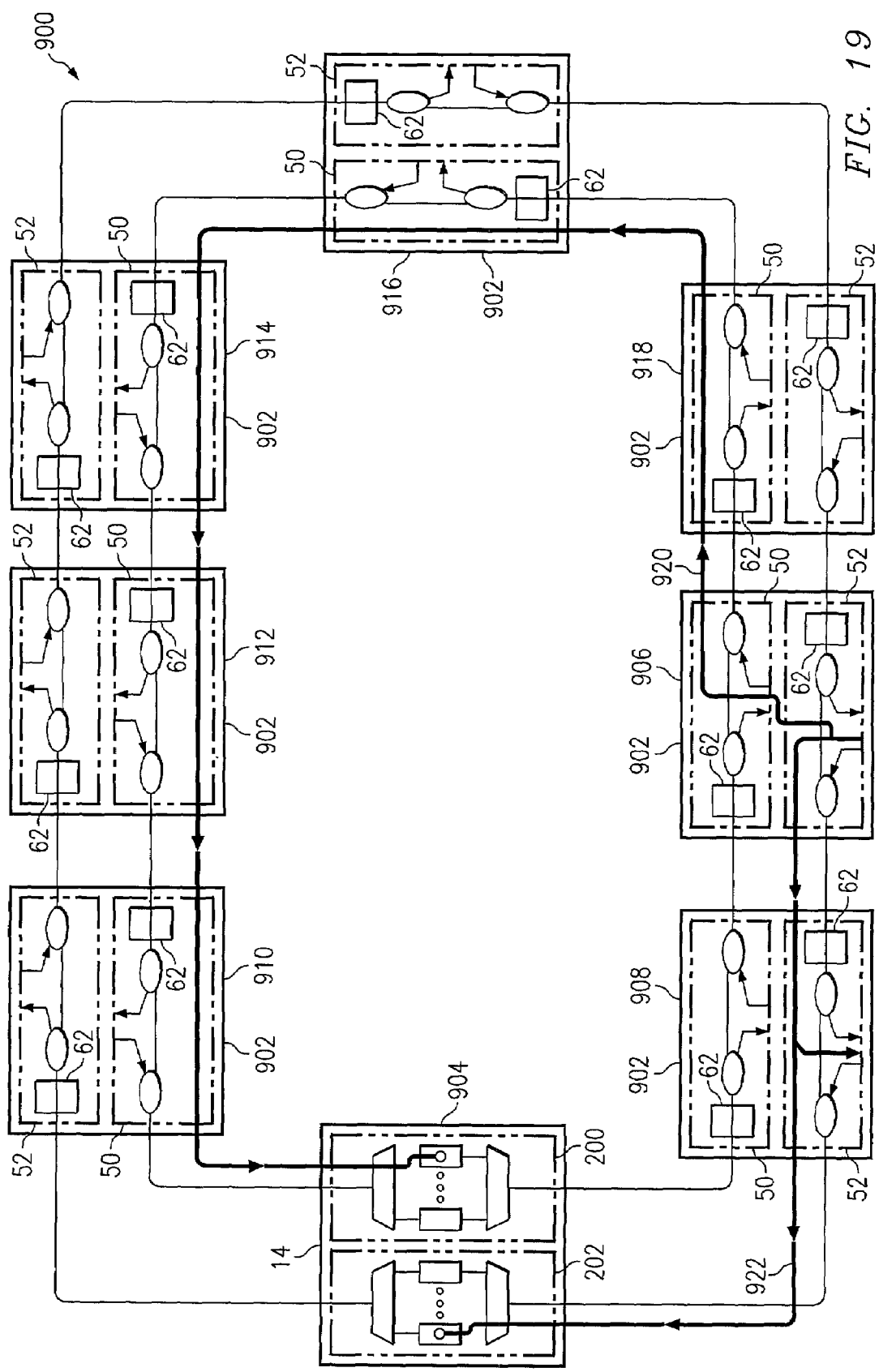

MULTIPLE SUBNETS IN AN OPTICAL RING NETWORK AND METHOD

TECHNICAL FIELD OF THE INVENTION

The present invention relates generally to optical transport systems, and more particularly to multiple subnets in an optical ring network and method.

BACKGROUND OF THE INVENTION

Telecommunications systems, cable television systems and data communication networks use optical networks to rapidly convey large amounts of information between remote points. In an optical network, information is conveyed in the form of optical signals through optical fibers. Optical fibers comprise thin strands of glass capable of transmitting the signals over long distances with very low loss.

Optical networks often employ wavelength division multiplexing (WDM) or dense wavelength division multiplexing (WDM) to increase transmission capacity. In WDM and DWDM networks, a number of optical channels are carried in each fiber at disparate wavelengths. Network capacity is based on the number of wavelengths, or channels, in each fiber and the bandwidth, or size of the channels.

The typology in which WDM and DWDM networks are built plays a key role in determining the extent to which such networks are utilized. Ring topologies are common in today's networks. WDM add/drop units serve as network elements on the periphery of such optical rings. By using WDM add/drop equipment that each network element (node), the entire composite signal can be fully demultiplexed into its constituent channels and switched (added/dropped or passed through).

SUMMARY OF THE INVENTION

The present invention provides multiple subnets in an optical ring network and method. In one embodiment, the optical subnets passively add and drop traffic to and from the optical ring and have, at least during normal operations, a majority of the wavelengths isolated from the other subnets on the ring.

In accordance with a particular embodiment of the present invention, an optical network includes an optical ring and at least three subnets. Each subnet includes a plurality of add/drop nodes coupled to the optical ring. The add/drop nodes are operable to passively add a first traffic stream in a first direction on the optical ring and a second traffic stream in a second direction on the optical ring. The first traffic stream comprises different content than the second traffic stream, and the first traffic stream and the second traffic stream are transmitted on the same wavelength. The network also includes a plurality of gateway nodes. The gateway nodes are each coupled to the optical ring at a boundary between neighboring subnets and are operable to selectively pass and terminate wavelengths between subnets to allow wavelength reuse in the subnets.

Technical advantages of the present invention include providing an improved optical ring network. In a particular embodiment, optical subnets with passive nodes are separated by wavelength reuse gateways, providing for a network with relatively low cost and high capacity.

Another technical advantage of the present invention includes providing a high capacity, passive ring network. In a particular embodiment, nodes are grouped in subnets such that the overall capacity of, for example, a two-subnet network may be almost doubled or quadrupled, depending on the passive node configuration. The capacity of a three-subnet network may be increased almost six fold, and that of a four-subnet network almost eight fold. Another technical advantage of the present invention provides fine granularity between metro access and metro core environments depending on customers' demand.

Yet another advantage of the present invention includes distributor and combiner elements that may be easily upgraded to provide functionality for additional subnets.

It will be understood that the various embodiments of the present invention may include some, all, or none of the enumerated technical advantages. In addition, other technical advantages of the present invention may be readily apparent to one skilled in the art from the following figures, description and claims.

BRIEF DESCRIPTION OF THE DRAWINGS

For a more complete understanding of the present invention and its advantages, reference is now made to the following description taken in conjunction with the accompanying drawings, wherein like numerals represent like parts, in which:

FIG. 4A is a block diagram illustrating details an optical wavelength reuse gateway of FIG. 1 in accordance with one embodiment of the present invention;

FIG. 9 is a flow diagram illustrating a method for transmitting traffic in an optical ring network with optical subnets in accordance with one embodiment of the present invention;

FIG. 10 is a flow diagram illustrating a method for protection switching in an optical ring network with optical subnets in accordance with one embodiment of the present invention;

FIG. 11 is a block diagram illustrating an optical ring network in accordance with another embodiment of the present invention;

FIG. 19 is a block diagram illustrating light paths of optical signals of the optical network of FIG. 18 in accordance with one embodiment of the present invention;

DETAILED DESCRIPTION OF THE INVENTION

Figure 1:
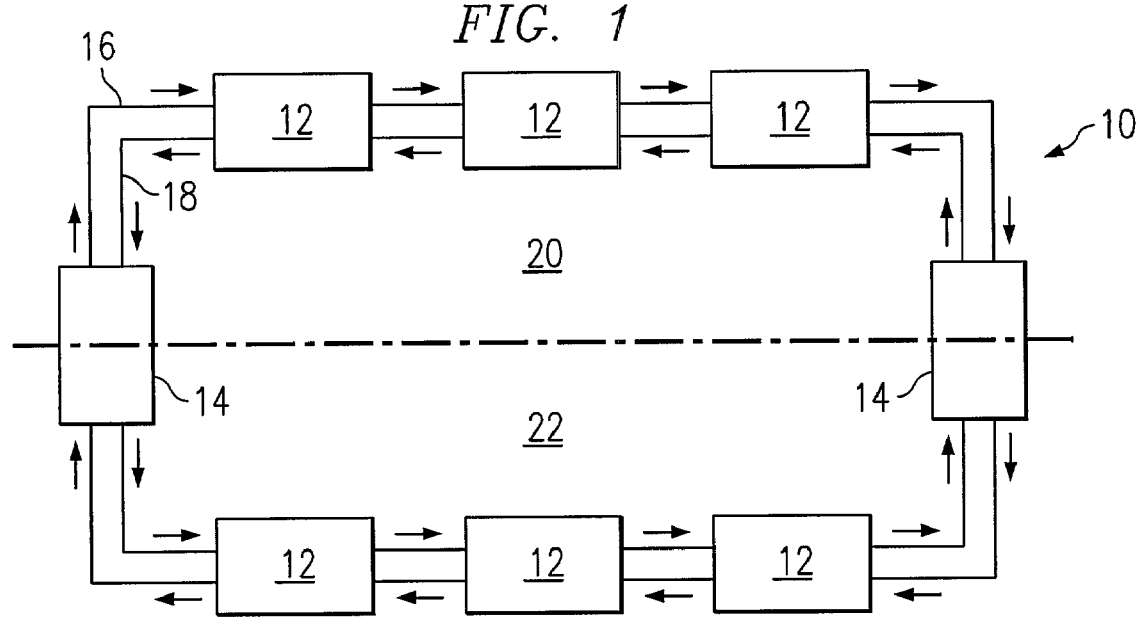
FIG. 1 is a block diagram illustrating an optical ring network in accordance with one embodiment of the present invention.

FIG. 1 is a block diagram illustrating an optical network 10 in accordance with one embodiment of the present invention. In accordance with this embodiment, the network 10 is an optical ring. An optical ring may include, as appropriate, a single, unidirectional fiber, a single, bi-directional fiber, or a plurality of uni- or bi-directional fibers. In the illustrated embodiment, the network 10 includes a pair of unidirectional fibers, each transporting traffic in opposite directions, specifically a first fiber, or ring, 16 and a second fiber, or ring, 18. Rings 16 and 18 connect a plurality of add/drop nodes (ADNs) 12 and optical wavelength reuse gateways 14. Network 10 is an optical network in which a number of optical channels are carried over a common path at disparate wavelengths. The network 10 may be an wavelength division multiplexing (WDM), dense wavelength division multiplexing (DWDM), or other suitable multi-channel network. The network 10 may be used in a short-haul metropolitan network, and long-haul inter-city network or any other suitable network or combination of networks.

Referring to FIG. 1, optical information signals are transmitted in different directions on the rings 16 and 18 to provide fault tolerance. The optical signals have at least one characteristic modulated to encode audio, video, textual, real-time, non-real-time and/or other suitable data. Modulation may be based on phase shift keying (PSK), intensity modulation (IM) and other suitable methodologies.

Figure 2:
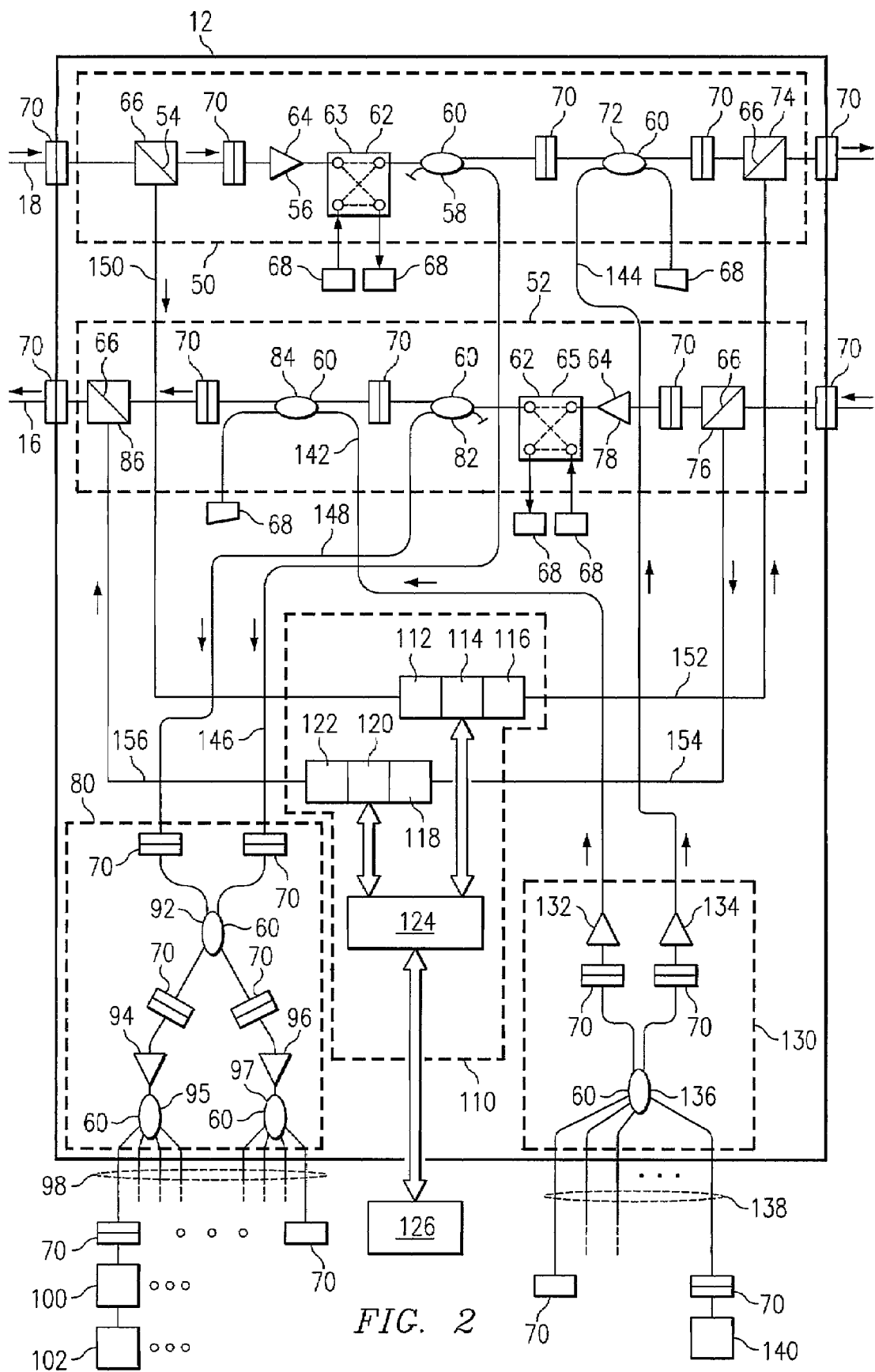
FIG. 2 is a block diagram illustrating details of an add/drop node of FIG. 1 in accordance with one embodiment of the present invention.

In the illustrated embodiment, the first ring 16 is a clockwise ring in which traffic is transmitted in a clockwise direction. The second ring 18 is a counterclockwise ring in which traffic is transmitted in a counterclockwise direction. The ADNs 12, one embodiment of which is further described in reference to FIG. 2, are each operable to passively add and drop traffic to and from the rings 16 and 18. In particular, each ADN 12 receives traffic from local clients and adds that traffic to the rings 16 and 18. At the same time, each ADN 12 receives traffic from the rings 16 and 18 and drops traffic destined for the local clients. As used herein, the term "each" means every one of at least a subset of the identified items. In adding and dropping traffic, the ADNs 12 may multiplex data from clients for transmittal in the rings 16 and 18 and may demultiplex channels of data from the rings 16 and 18 for clients. Traffic may be dropped by making the traffic available for transmission to the local clients. Thus, traffic may be dropped and yet continue to circulate on a ring. The ADNs 12 communicate the traffic on the rings 16 and 18 regardless of the channel spacing of the traffic—thus providing "flexible" channel spacing in the ADNs 12. "Passively" in this context means the adding or dropping of channels without power, electricity, and/or moving parts. An active device would thus use power, electricity or moving parts to perform work. In a particular embodiment of the present invention, traffic may be passively added to and/or dropped from the rings 16 and 18 by splitting/combining, which is without multiplexing/demultiplexing, in the transport rings and/or separating parts of a signal in the ring.

Rings 16 and 18 and the ADNs 12 are subdivided into subnets 20 and 22, with the gateways 14 forming the subnet boundaries. A subnet may be defined as a subset of nodes on a ring whose wavelengths are not isolated from each other and which may comprise traffic streams from nodes within the subnet, but whose wavelengths are isolated from traffic streams from other nodes on the ring, except for a minority of wavelengths (at least during normal operations) that transport traffic streams that pass through, enter or exit the subnet in order to reach their destination nodes. The gateways may be operable to terminate ingress traffic channels from a subnet that have reached their destination ADNs (including those that have or will reach their destination nodes in an opposite direction) and to forward ingress traffic channels from a subnet that have not reached their destination ADNs. In one embodiment, the gateway nodes may comprise a demultiplexer to demultiplex the signal into constituent traffic channels, switches to selectively terminate traffic channels, and a multiplexer to multiplex the remaining signal before exiting the gateway. Further details regarding the gateways 14 are described below in reference to FIG. 4A.

Each ring 16 and 18 is open at least one point for each channel. The opening for each channel in the rings 16 and 18 may be a physical opening, an open, crossed, or other non-closed switch, a filter, a deactivated transmission device or other obstruction operable to completely or effectively terminate, and thus remove channels from the rings 16 and 18 at the terminal points such that interference of each channel with itself due to recirculation is prevented or minimized such that the channels may be received and decoded within normal operating limits. As described further below in reference to FIG. 6, the rings 16 and 18 may, in response to a line cut or other interruption, be provisioned to terminate in ADNs 12 adjacent to the interruption using switch elements in ADNs 12. Switch elements may comprise simple on-off switches, 2×2 switches, optical cross connects, or other suitable switch elements.

In one embodiment, a portion of the channels are open at the boundaries of the subnets at both gateways 14. Within each subnet, traffic is passively added to and passively dropped from the rings 16 and 18, channel spacing is flexible, and the nodes are free to transmit and receive signals to and from nodes within the subnet. Such traffic may be referred to as "intra-subnet traffic." Another portion of the traffic—"inter-subnet traffic"—may travel to and from nodes in the other subnet, and the lightpaths of such traffic would be open at only one of the gateways. Such inter-subnet traffic traverses or travels within at least part of two subnets.

Because an intra-subnet traffic stream utilizes its wavelength/channel only within its subnet, the wavelength/channel used for intra-subnet traffic in one subnet is free to be used in the other subnet by another traffic stream. In this way, the present invention increase the overall capacity of the network, while maintaining flexible channel spacing within individual subnets.

Furthermore, it is possible to protect a first traffic stream in a channel within in a first subnet by assigning a terminable status to a second channel stream using the same channel in the second subnet, such that the second channel stream becomes a protection channel access (PCA) stream. Terminable signals are signals that are terminated to provide protection to other signals. Protectable signals are signals for which protection is provided. In this way, in the event of a line cut or other interruption causing the first traffic stream to not reach all of its destination nodes, the second traffic stream may be terminated and a gateway switch for that channel closed, thus allowing the first traffic stream to travel through the gateway and through the second subnet back to the destination nodes of the first subnet and avoiding the interruption. After the interruption has been repaired, the network may revert to its pre-interruption state such that open gateway switches for the channel again separate the network into two subnets for the channel. Details of such protection switching are described further in reference to FIG. 6.

A protocol for assigning channels to traffic in the network may be devised to allow for efficient and simple provisioning of the network. For example, protection-switchable traffic from ADNs in subnet 20 is conveyed in odd-numbered channels and non-protected, terminable traffic from ADNs in subnet 20 is conveyed in even numbered channels, whereas protection-switchable traffic from ADNs in subnet 22 is conveyed in even-numbered channels and non-protected, terminable traffic from ADNs in subnet 22 is conveyed in odd-numbered channels. In this way, a protection-switchable traffic stream in one subnet will be assured a protection path occupied only by terminable traffic in the other subnet. In one embodiment, the protection-switchable traffic may comprise higher-priority traffic than the terminable traffic; however, it will be understood that other divisions of the traffic streams into protection-switchable and terminable portions may be suitable or desirable in other embodiments.

Inside a subnet, the optical fiber or fibers act as a shared medium. The gateway dividing two sectors breaks the spatial continuity between the two-shared mediums. For a given network the number of sectors needed depends on the maximum capacity of each node. Though network traffic is dynamic in one embodiment, the number of transponder cards needed at each node to provision lightpaths makes the upper bound on traffic an estimable quantity. Let $Tr_i$ be the upper bound on traffic (in lightpaths) emanating from node 'i' and $(\Sigma Tr_i)_{max}$ is the cumulative maximum traffic in the ring. Further if the total number of wavelengths (assuming equal channel spacing) is $\lambda_{max}$, then the maximum number of subnets is given as $S_{max}=(\Sigma Tr_i)_{max}/\lambda_{max}+1$.

```
Algorithm:
Initialize j ←1; t←1; sum ←0
    for i=1:N
        sum=sum+cap(N_i)
        if sum>=λ_max
            subnet(j) = node(t...N_{i-1})
            sum ←0;
            j=j+1
            t←N_i
        elseif i=N & j>1
            subnet(j) = node(t...N)
        end
    end
```

Consecutive nodes that have a cumulative bandwidth requirement approximately equal or less than the total available bandwidth (in lightpaths) are grouped together into one subnet. The last node of each subnet may be a gateway. Moreover for an arbitrary network the last subnet may not be as heavily loaded as the other subnets.

Two kinds of lightpath establishment deserves attention, intra-subnet lightpath establishment and inter-subnet lightpath establishment. The wavelength assignment algorithm may maximize wavelength reuse. It also may assign wavelengths heuristically such that all intra-subnet (ingress and egress nodes in the same subnet) lightpaths are assigned the lowest available wavelength. On the other hand inter-subnet lightpaths (those whose ingress and egress nodes are on different subnets or different rings for that matter) are assigned on the highest possible wavelengths. This way we have a static load balancing which also may reduce the number of net transponder card type required in the ring.

In one embodiment, each subnet has a wavelength channel capacity substantially equal to the optical network. Substantially equal in this context in one embodiment may mean the subnet has eighty percent of its wavelengths isolated from the other subnets and available for intra-subnet traffic. In other embodiments, substantially equal may mean ninety percent another suitable percentage.

The network may be divided into subnets based on bandwidth usage per node. For example, a network may have N nodes, the maximum capacity (in terms of bandwidth) of the network, and the typical capacity per node. Let $k_i$ be the bandwidth required for the $i^{th}$ node such that the total needed bandwidth needed in the network is $$\sum_{i=0}^{n} k_i.$$

Bandwidth is distributed to each node, and the first subnet is built when either the total bandwidth is exhausted completely or when the subnet bandwidth is such that addition of the next node would create a excess bandwidth issue. This process is repeated until each node is placed in a possible subnet.

The net number of subnets may be generally proportional to the total cumulative minimum bandwidth required by all nodes in the network. The procedure for setting up subnets may be heuristic as well as static. For N nodes, if there are D number of subnets and if G is the total bandwidth needed then G/D need not necessarily be N due to the excess bandwidth. In one embodiment of the present invention, up to sixteen percent (16%), the total number of transporter cards can be saved when compared to a standard network.

Each node may have a minimum fixed capacity for transmission. Each node may also have a maximum variable capacity for transmission and this is generally the upper bound on its maximum traffic requirement. Within the subnet the nodes may be free to communicate with each other. Each node is allotted a band for transmission that can "listen" to the entire bandwidth for reception. This band is a dedicated band, and in addition can also have a small overlap section which can be used for non-dedicated applications by intelligent multiplexing of statistical bandwidth access.

FIG. 2 is a block diagram illustrating details of an ADN 12 of FIG. 1 in accordance with one embodiment of the present invention. Referring to FIG. 2, the node 12 comprises counterclockwise transport element 50, clockwise transport element 52, distributing element 80, managing element 110, and combining element 130. In one embodiment, the elements 50, 52, 80, 110, and 130 as well as components within the elements may be interconnected with optical fiber links. In other embodiments, the components may be implemented in part or otherwise with planar waveguide circuits and/or free space optics. In addition, the elements of ADN 12 may each be implemented as one or more discrete cards within a card shelf of the ADN 12. Exemplary connectors 70 for a card shelf embodiment are illustrated by FIG. 2. The connectors 70 may allow efficient and cost effective replacement of failed components. It will be understood that additional, different and/or other connectors may be provided as part of the ADN 12.

Transport elements 50 and 52 may each comprise passive couplers or other suitable optical splitters/couplers 60, ring switch 62, amplifier 64, and OSC filters 66. Ring switch 62 may be a 2×2 switch or other switch element operable to selectively open the connected ring 16 or 18. In the 2×2 embodiment, the switch 62 includes a "cross" or open position and a "through" or closed position. The open position allows the ring openings in the ADNs 12 to be selectively reconfigured to provide protection switching.

Amplifier 64 may comprise an EDFA or other suitable amplifier. In one embodiment, the amplifier is a preamplifier and may be selectively deactivated to open a connected ring 16 or 18 to provide protection switching in the event of failure of the adjacent switch 64. In this embodiment, the preamplifier 64 and the switch 62 are disposed in the transport elements 50 and 52 inside of the OSC filters and between the ingress filter 66 and the splitter/couplers 60. Thus, the OSC signal may be recovered regardless of the position of switch 64 or operation of preamplifier 64. In another embodiment, OSC signals may be transmitted in-band with revenue-generating traffic by placing OSC filters between the couplers 60. OSC filters 66 may comprise thin film type, fiber grating or other suitable type filters.

The transport segments may comprise either a single splitter/coupler or a plurality of couplers/splitters which allow for the passive adding and dropping of traffic. In the illustrated embodiment, counterclockwise transport segment 50 in the illustrated embodiment includes a passive optical splitter set having a counterclockwise drop coupler 58 and a counterclockwise add coupler 72. The counterclockwise transport element 50 further includes OSC filters 54 and 74 at the ingress and egress edges, and counterclockwise amplifier 56 between the ingress OSC filter 54 and counterclockwise ring switch 63.

Clockwise transport segment 52 includes a passive optical splitter set including clockwise drop coupler 82 and clockwise add coupler 84. Clockwise transport element 52 further includes OSC filters 76 and 86, clockwise amplifier 78, and clockwise ring switch 65. OSC filters 76 and 86 are disposed at the ingress and egress edges of the clockwise transport element 52. The clockwise amplifier 78 is disposed between the ingress OSC filter 76 and the clockwise ring switch 65.

Distributing element 80 may comprise a plurality of distributing amplifiers. In this embodiment, the distributing element 80 may comprise a drop coupler feeding into the distributing amplifiers which each include an amplifier and an optical splitter. For example, a first distributing amplifier may include amplifier 94 and optical splitter 95 while a second distributing amplifier may include amplifier 96 and splitter 97. The amplifiers 94 and 96 may comprise EDFAs or other suitable amplifiers. Splitters 95 and 97 may comprise splitters with one optical fiber ingress lead and a plurality of optical fiber drop leads 98. The drop leads 98 may be connected to one or more filters 100 which in turn may be connected to one or more drop optical receivers 102.

Combining element 130 may be a amplified combiner and may comprise a splitter 136 with a plurality of optical fiber add leads 138 which may be connected to one or more add optical senders 140 associated with a client. Splitter 136 further comprises two optical fiber egress leads which feed into amplifiers 132 and 134. Amplifiers 132 and 134 may comprise EDFAs or other suitable amplifiers.

Managing element 110 may comprise OSC senders 116 and 122, OSC interfaces 114 and 120, OSC receivers 112 and 118, and an element management system (EMS) 124. Each OSC sender, OSC interface and OSC receiver set forms an OSC unit for one of the rings 16 and 18 in the node 12. The OSC units receive and transmit OSC signals for the EMS 124. The EMS 124 may be communicably connected to a network management system (NMS) 126. NMS 126 may reside within node 12, in a different node, or external to all of the nodes 12.

EMS 124 and/or NMS 126 may comprise logic encoded in media for performing network and/or node monitoring, failure detection, protection switching and loop back or localized testing functionality of the network 10. Logic may comprise software encoded in a disk or other computer-readable medium and/or instructions encoded in an application specific integrated circuit (ASIC), field programmable gate array (FPGA), or other processor or hardware. It will be understood that functionality of EMS 124 and/or NMS 126 may be performed by other components of the network 200 and/or be otherwise distributed or centralized.

For example, operation of NMS 126 may be distributed to the EMS of nodes 12 and 14 and the NMS 126 thus omitted as a separate, discrete element. Similarly, the OSC units may communicate directly with NMS 126 and EMS 124 omitted.

The ADN 12 further comprises counterclockwise add fiber segment 144, counterclockwise drop fiber segment 146, clockwise add fiber segment 142, clockwise drop fiber segment 148, OSC fiber segments 150, 152, 154, and 156, and connectors 68. As illustrated, connection 68 may be angled to avoid reflection. As previously described a plurality of passive physical contact connectors 70 may be included where appropriate so as to communicably connect the various elements of ADN 12.

In operation, the transport elements 50 and 52 are operable to passively add local traffic to the rings 16 and 18 and to passively drop at least local traffic from the rings 16 and 18. The transport elements 50 and 52 are further operable to passively add and drop the OSC signal to and from the rings 16 and 18. More specifically, in the counterclockwise direction, OSC filter 54 processes an ingress optical signal from counterclockwise ring 18. OSC filter 54 filters OSC signal from the optical signal and forwards the OSC signal to the OSC interface 114 via fiber segment 150 and OSC receiver 112. OSC filter 54 also forwards or lets pass the remaining transport optical signal to amplifier 56. By placing the OSC filter 54 before ring switch 63, the ADN 12 is able to recover the OSC signal regardless of the position of the ring switch 63.

Amplifier 56 amplifies the signal and forwards the signal to ring switch 63. Ring switch 63 is selectively operable to transmit the optical signal to coupler 58 when the ring switch 63 is set to the through (closed) setting, or to transmit the optical signal to an OSA connector 68 when the ring switch 63 is set to the cross (open) setting. Further details regarding the OSA connectors are described below.

If ring switch 63 is set in the cross position, the optical signal is not transmitted to couplers 58 and 72, the ring 18 is open at the ADN 12, and dropping of traffic from the ring 18 at node 12 and pass-through of traffic does not occur at node 12. If the ring switch 63 is set in the through position, the optical signal is forwarded to couplers 58 and 72 and adding and dropping of traffic to and from the ring 18 at node 12 may occur at node 12.

Coupler 58 passively splits the signal from switch 63 into two generally identical signals. A passthrough signal is forwarded to coupler 72 while a drop signal is forwarded to distributing element 80 via segment 146. The signals may be substantially identical in content, although power and/or energy levels may differ. Coupler 72 passively combines the passthrough signal from coupler 58 and an add signal comprising local add traffic from combining element 130 via fiber segment 144. The combined signal is passed to OSC filter 74.

OSC filter 74 adds an OSC signal from the OSC interface 114, via the OSC sender 116 and fiber segment 152, to the combined optical signal and forward the combined signal as an egress transport signal to ring 18. The added OSC signal may be locally generated data or may be received OSC data passed through by the EMS 124.

In the clockwise direction, OSC filter 76 receives an ingress optical signal from clockwise ring 16. OSC filter 76 filters the OSC signal from the optical signal and forwards the OSC signal to the OSC interface 120 via fiber segment 154 and OSC receiver 118. OSC filter 76 also forwards the remaining transport optical signal to amplifier 78.

Amplifier 78 amplifies the signal and forwards the signal to ring switch 65. Ring switch 65 is selectively operable to transmit the optical signal to coupler 82 when the ring switch 65 is set to the through setting, or to transmit the optical signal to an OSA connector 68 when the ring switch 65 is set to the cross setting.

If the ring switch 65 is set in the cross position, the optical signal is not transmitted to couplers 82 and 84, the ring 16 is open at the node 12, and dropping of traffic the ring 16 and "pass-through" of traffic does not occur at node 12. If the ring switch 65 is set in the through position, the optical signal is forwarded to couplers 82 and 84 and adding and dropping of traffic to and from the ring 16 may occur at node 12.

Coupler 82 passively splits the signal from switch 65 into generally identical signals. A passthrough signal is forwarded to coupler 84 while a drop signal is forwarded to distributing unit 80 via segment 148. The signals may be substantially identical in content and/or energy. Coupler 84 passively combines the passthrough signal from coupler 82 and an add signal comprising local add traffic from combining element 130 via fiber segment 142. The combined signal is passed to OSC filter 86.

OSC filter 86 adds an OSC signal from the OSC interface 120, via the OSC sender 122 and fiber segment 156, to the combined optical signal and forwards the combined signal as an egress transport signal to ring 16. As previously described, the OSC signal may be locally generated data or data passed through by EMS 124.

Prior to addition to the rings 16 and 18, locally-derived traffic is transmitted by a plurality of add optical senders 140 to combining element 130 of the node 12 where the signals are combined, amplified, and forwarded to the transport elements 50 and 52, as described above, via counterclockwise add segment 144 and clockwise add segment 142. The locally derived signals may be combined by the optical coupler 136, by a multiplexer or other suitable device.

Locally-destined traffic is dropped to distributing element 80 from counterclockwise drop segment 146 and clockwise drop segment 148. Distributing element 80 splits the drop signal comprising the locally-destined traffic into multiple generally identical signals and forwards each signal to an optical receiver via a drop lead 98. The signal received by optical receivers 102 may first be filtered by filters 100. Filters 100 may be tunable filters or other suitable filters and receivers 102 may be broadband or other suitable receivers.

EMS 124 monitors and/or controls all elements in the node 12. In particular, EMS 124 receives an OSC signal in an electrical format via OSC filters 66, OSC receivers 112 and 118, OSC senders 116 and 122, and OSC interfaces 114 and 120. EMS 124 may process the signal, forward the signal and/or loop back the signal. Thus, for example, the EMS 124 is operable to receive the electrical signal and resend the OSC signal to the next node, adding, if appropriate, node-specific error information or other suitable information to the OSC.

In one embodiment each element in a node 12 monitors itself and generates an alarm signal to the EMS 124 when a failure or other problem occurs. For example, EMS 124 in node 12 may receive one or more of various kinds of alarms from the elements and components in the node 12: an amplifier loss-of-light (LOL) alarm, an amplifier equipment alarm, an optical receiver equipment alarm, optical sender equipment alarm, a distributing amplifier LOL alarm, a distributing amplifier equipment alarm, an amplified combiner LOL alarm, an amplified combiner equipment alarm, or other alarms. Some failures may produce multiple alarms.

For example, a fiber cut may produce amplifier LOL alarms at adjacent nodes and also error alarms from the optical receivers.

In addition, the EMS 124 may monitor the wavelength and/or power of the optical signal within the node 12 via connections (not shown) between connectors 68 and an optical spectrum analyzer (OSA) communicably connected to EMS 124.

The NMS 126 collects error information from all of the nodes 12 and 14 and is operable to analyze the alarms and determine the type and/or location of a failure. Based on the failure type and/or location, the NMS 126 determines needed protection switching actions for the network 10. The protection switch actions may be carried out by NMS 126 by issuing instructions to the EMS in the nodes 12 and 14.

Error messages may indicate equipment failures that may be rectified by replacing the failed equipment. For example, a failure of one of the amplifiers in the distributing element may trigger a distributing amplifier alarm. The failed amplifier can then be replaced. A failed coupler in the distributing element may be likewise detected and replaced. Similarly, a failure of an optical receiver or sender may trigger an optical receiver equipment alarm or an optical sender equipment alarm, respectively, and the optical receiver or sender replaced as necessary.

In another embodiment of the present invention, redundant ring switches may be provided in the transport elements. The redundant ring switches may allow for continued circuit protection in the event of switch failure, and failed ring switches may be replaced without interfering the node operations or configuration. Ring switch failure may comprise, among other things, failure of a ring switch to change from the cross position to a through position, failure of a ring switch to change from a through position to the cross position, or the switch becoming fixed in an intermediate position. The redundant ring switches may thus allow for protection switching in the event that a switch fails to switch from the closed position to the open position. Alternatively, redundancy in the event of a switch stuck in the closed position can be accomplished without a redundant switch by turning off the amplifier for that ring in the node with the failed switch, thus effectively terminating the signal at the amplifier.

In various other embodiments of the ADNs 12, the ADNs 12 may comprise active nodes, passive nodes, or a combination of active and passive nodes. Nodes may be passive in that they include no switches, switchable amplifiers, or other active devices. Nodes may be active in that they include optical switches, switchable amplifiers, or other active devices in the transport elements or otherwise in the node. Passive nodes may be of a simpler and less expensive design. In one embodiment, the network comprises a combination of active and passive nodes. In this way, active nodes may provide for protection switching functionality while the addition of passive nodes may allow for additional ADNs in the network while minimizing the additional cost associated with the additional nodes.

In other embodiments of the present invention, described in more detail in reference to FIGS. 11-16, the distributing element and the combining element may comprise a divided distributing element (DDE) and a divided combining element (DCE), respectively. Whereas in the embodiment shown in FIG. 2 the combining element forwards traffic to both rings simultaneously and each receiver of the distributing element receives traffic from both rings, in the DDE/DCE embodiments, individual traffic channels may be forwarded to the clockwise ring or to the counterclockwise ring by the DCE, and received by the DDE from the clockwise ring or from the counterclockwise ring. During protection switching, the DCE may switch from forwarding a particular channel from one ring to the other. In this way, the DDE/DCE embodiments provide for either the two-subnet configuration shown in FIG. 1 or a configuration with a greater number of subnets.

Figure 3:
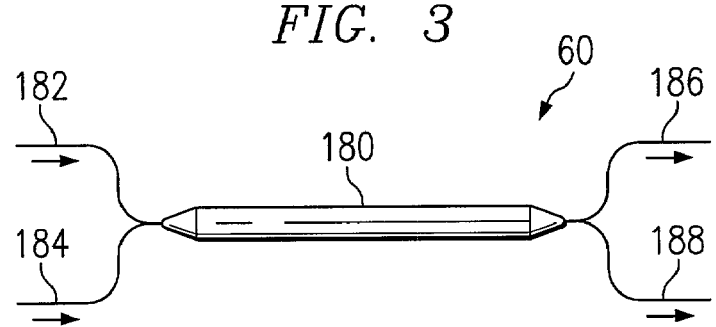
FIG. 3 is a block diagram illustrating details of an optical coupler of the node of FIG. 2 in accordance with one embodiment of the present invention.

FIG. 3 is a block diagram illustrating details of an optical splitter/coupler 60 of the node of FIG. 2 in accordance with one embodiment of the present invention. In this embodiment, the optical splitter/coupler 60 is a fiber coupler with two inputs and two outputs. The optical splitter/coupler 60 may in other embodiments be combined in whole or part with a waveguide circuit and/or free space optics. It will be understood that the splitter/coupler 60 may include one or any number of any suitable inputs and outputs and that the splitter/coupler 60 may comprise a greater number of inputs than outputs or a greater number of outputs than inputs.

Referring to FIG. 3, the optical splitter/coupler 60 comprises a main body 180, first entry segment 182, second entry segment 184, first exit segment 186, and second exit segment 188 First entry segment 182 and first exit segment 186 comprise a first continuous optical fiber. Second entry segment 184 and second exit segment 188 comprise a second continuous optical fiber. Outside of the main body 180, segments 182, 184, 186, and 188 may comprise a jacket, a cladding, and a core fiber. Inside the main body 180, the jacket and cladding may be removed and the core fibers twisted or otherwise coupled together to allow the transfer of optical signals and/or energy of the signals between and among the first and second continuous optical fibers. In this way, the optical splitter/coupler 60 passively combines optical signals arriving from entry segments 182 and 184 and passively splits and forwards the combined signal via exit segments 186 and 188. A plurality of signals may be combined and the combined signal split by combining and thereafter splitting the combined signal or by simultaneously combining and splitting the signals by transferring energy between fibers.

The optical splitter/coupler 60 provides flexible channel-spacing with no restrictions concerning channel-spacing in the main streamline. In a particular embodiment, the coupler has a directivity of over −55 dB. Wavelength dependence on the insertion loss is less than about 0.5 dB over a 100 nm range. The insertion loss for a 50/50 coupler is less than about −3.5 dB.

FIG. 4A is a block diagram illustrating details an optical wavelength reuse gateway of the network of FIG. 1 in accordance with one embodiment of the present invention. In this embodiment, each channel (wavelength) is separated from the multiplexed signal and independently passed or terminated. In other embodiments, groups of channels may be passed or terminated. As previously described, the gateway is disposed between, and may form the boundary of, neighboring subnets. A channel reuse gateway in one embodiment may be any suitable node, nodes or element of one or more nodes that is configurable to selectively isolate or expose wavelengths between nodes in one or more directions of a ring or other suitable network configuration. Wavelength reuse may in one embodiment be the use of a wavelength in a ring or other suitable network to transport disparate traffic streams in a same fiber or direction.

Referring to FIG. 4A, the wavelength reuse gateway comprises a management element 110 comprising OSC senders 116 and 122, OSC interfaces 114 and 120, OSC receivers 112 and 118, and an EMS 124, as described above in reference to FIG. 2. The EMS 110 is connected to transport elements 200 and 202 via OSC fiber segments 150, 152, 154, and 156, again as described in reference to FIG. 2.

As described above in reference to FIG. 2, counterclockwise transport element 200 comprises OSC filters 54 and 74, pre-amplifier 56, and post-amplifier 78. Clockwise transport element 202 comprises OSC filters 76 and 86, pre-amplifier 56, and post-amplifier 78. Transport elements 200 and 202 further comprises mux/demux units 214. Mux/demux units 214 may each comprise demultiplexer 206, multiplexer 204, and switch elements which may comprise an array of switches 210 or other components operable to selectively pass or terminate a traffic channel. In a particular embodiment, multiplexers 204 and demultiplexers 206 may comprise arrayed waveguides. In another embodiment, the multiplexers 204 and the demultiplexers 206 may comprise fiber Bragg gratings. The switches 210 may comprise 2×2 or other suitable switches, optical cross-connects, or other suitable switches operable to terminate the demultiplexed traffic channels.

Pre-amplifiers 56 may use an automatic level control (ALC) function with wide input dynamic-range and automatic gain control (AGC). Post-amplifiers 78 may deploy AGC to realize gain-flatness against input power variation due to channel add/drop, too. In a particular embodiment, the amplifiers 56 and 78 may be gain variable amplifiers, such as, for example, as described in U.S. Pat. No. 6,055,092.

In operation, counterclockwise transport element 200 receives a WDM signal, comprising a plurality of channels, from ring 18. OSC filter 54 filters the OSC signal from the optical signal as described above and the remaining optical signal is forwarded to amplifier 56, as described above. Demultiplexer 206 demultiplexes the optical signal into its constituent channels. Switches 210 selectively forward or terminate channels to multiplexer 204. Multiplexer 204 multiplexes the channels into one optical signal and to forward the optical signal to OSC filter 74. OSC filter 74 adds the OSC signal from EMS 110, and the ring 18 receives the egress signal.

Clockwise transport segment 202 receives an optical signal from ring 16. OSC filter 76 filters the OSC signal from the optical signal as described above and the remaining optical signal is forwarded to amplifier 78, as described above. Demultiplexer 206 demultiplexes the optical signal into its constituent channels. Switches 210 selectively forward or terminate channels to multiplexer 204. Multiplexer 204 multiplexes the channels into one optical signal and to forward the optical signal to OSC filter 86. OSC filter 86 adds the OSC signal from EMS 110, and the ring 18 receives the egress signal.

EMS 110 configures mux/demux units 214 to provide protection switching. Protection switching protocols are described in greater detail below. In accordance with various embodiments, gateways 14 may be further operable to add and drop traffic from and to local clients and/or to and from other networks.

In accordance with various other embodiments, gateway 14 may be further provisioned to passively add and drop traffic to the optical rings. For example, in accordance with one embodiment, transport units 50 and 52 of FIG. 2 may be added to gateway 14 on the rings 16 and 18 next to the mux/demux units 214. In another embodiment, traffic may be added via the add and drop leads of 2×2 switches within the mux/demux units. Further details regarding this latter embodiment are described below in reference to FIG. 4B.

Figure 4B:
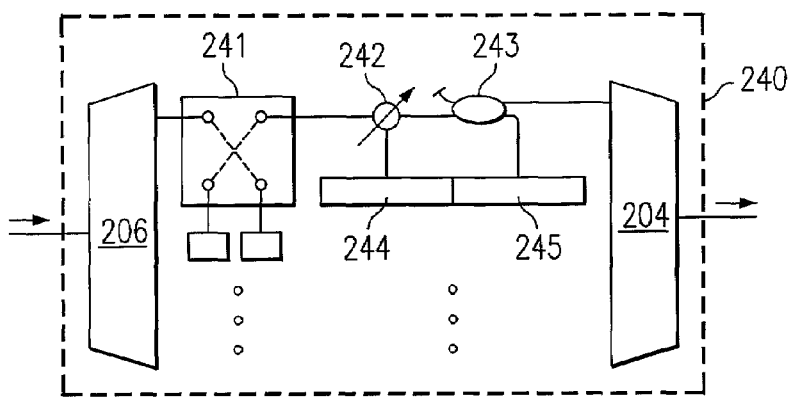
FIG. 4B is a block diagram illustrating a mux/demux unit for the gateway of FIG. 4A in accordance with another embodiment of the present invention.

FIG. 4B is a block diagram illustrating a mux/demux unit of the gateway of FIG. 4A in accordance with another embodiment of the present invention. In accordance with this embodiment, mux/demux unit 240 of FIG. 4B may be substituted for mux/demux modules 214 of FIG. 4A.

Referring to FIG. 4B, mux/demux unit 240 comprises demultiplexer 206 and multiplexer 204 as described above in reference to FIG. 4A. In place of the plurality of switches 210 are a plurality of 2×2 switch/attenuator sets each comprising 2×2 switch 241, variable optical attenuator (VOA) 242, optical splitter 243, photodetector 245, and controller 244. VOA 242 attenuates the ingress signal to a specified power level based on a feedback loop including splitter 243 which taps the signal, photodetector 245 which detects the power level of the signal and feedback controller 244 which controls VOA 244 based on the detected power level. In this way, the rings may be opened for a particular channel by switching the 2×2 switch to the "cross" position, and the power level of the "through" signal when the 2×2 switch is in the "through" position may be adjusted. Also, as described above, traffic may be added and/or dropped from the rings via the add and drop leads of 2×2 switches 241.

Figure 4C:
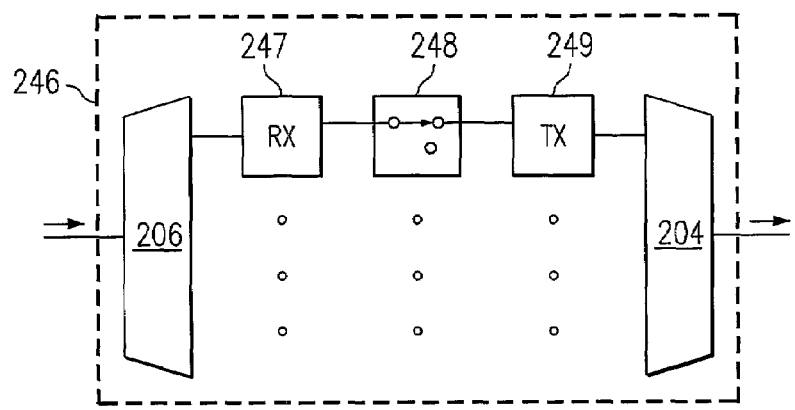
FIG. 4C is a block diagram illustrating a mux/demux unit for the gateway of FIG. 4A in accordance with yet another embodiment of the present invention.

FIG. 4C is a block diagram illustrating a mux/demux unit of the gateway of FIG. 4A in accordance with yet another embodiment of the present invention. In accordance with this embodiment, the unit is an optical-electrical-optical (O-E-O) unit. Unit 246 of FIG. 4C may be substituted for mux/demux modules 214 of FIG. 4A.

Referring to FIG. 4C, O-E-O unit 246 comprises demultiplexer 206 and multiplexer 204 as described above in reference to FIG. 4A. In place of the plurality of switches 210 are a plurality of O-E-O elements, each comprising receivers 247, switches 248, and transmitters 249. A demultiplexed signal is passed to the receiver 247 corresponding to its channel, wherein the optical signal is converted to an electrical signal. Switches 248 are operable to selectively pass or terminate the electrical signal from receiver 247. A signal passed through via switch 248 is forwarded to transmitter 249, wherein the signal is converted to an optical signal. Optical signals from the plurality of transmitters 249 are multiplexed in multiplexer 204 and the multiplexed signal forwarded as described above in reference to FIG. 4A. Thus, O-E-O unit 246 may act as a regenerator of the signals passing through the gateway 14.

Figure 5:
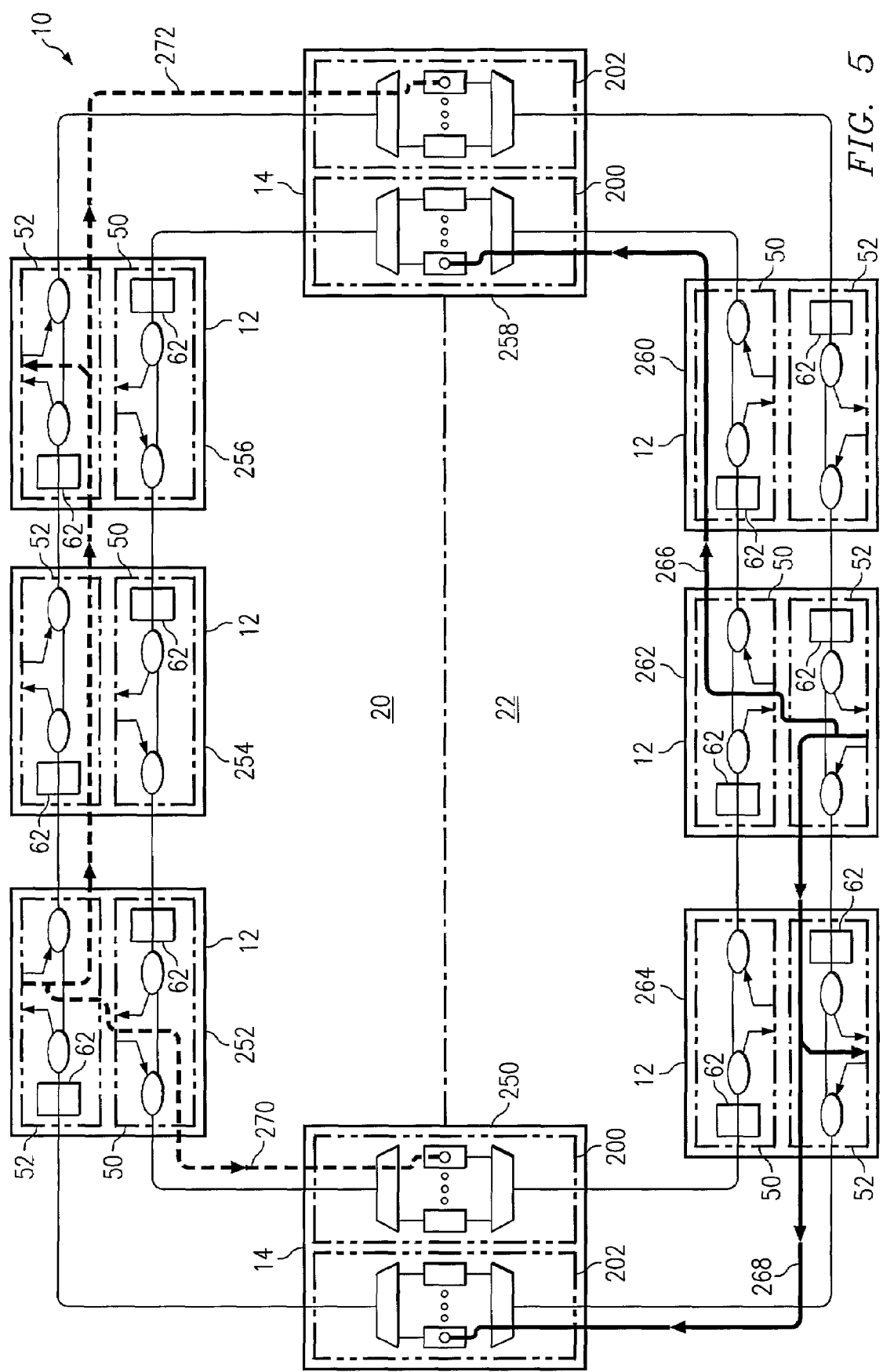
FIG. 5 is a block diagram illustrating light paths of intra-subnet optical signals of the optical network of FIG. 1 in accordance with one embodiment of the present invention.

FIG. 5 is a block diagram illustrating light paths of optical signals of the optical network of FIG. 1 in accordance with one embodiment of the present invention. In FIG. 5, paths of exemplary intra-subnet signals are illustrated. For ease of reference, only high-level details of the transport elements of ADNs 12 and gateways 14 are shown. In addition, ADNs 12 are assigned individual reference numbers, with ADNs 252, 254, and 256 within subnet 20 and ADNs 260, 262, and 264 within subnet 22. Gateways 14, forming the boundary between subnets 20 and 22 are also assigned individual reference numbers 250 and 258.

Lightpaths 266 and 268 represent a traffic stream added to the network from an origination node ADN 262 (the "ADN 262 traffic stream") in the counterclockwise and clockwise directions, respectively. In the illustrated embodiment, the intended destination node of the ADN 262 traffic stream is ADN 264. Lightpath 266 terminates at gateway 258 at an open switch (or "cross" state of 2×2 switch) in counterclockwise transport segment 200 corresponding to the channel of the traffic stream. Lightpath 268 terminates at gateway 250 in clockwise transport segment 202 at an open switch in clockwise transport segment 202 corresponding to the channel of the traffic stream. It will be noted that, although FIG. 5 shows node 264 as the destination node, the traffic also reaches the drop ports of ADN 260 and of gateways 250 and 258 (if any). Likewise, traffic originating from nodes 252, while shown as having a destination node ADN 256, also reaches the drop ports of ADN 254 and of gateways 250 and 258 (if any). Thus, the network has a broadcasting function within the subnets.

In the illustrated embodiment, lightpaths 270 and 272 represent a traffic stream added to the network from an origination node ADN 252 (the "ADN 252 traffic stream") in the counterclockwise and clockwise directions, respectively. In the illustrated embodiment, the intended destination node of the ADN 252 traffic stream is ADN 256. Lightpath 270 terminates at gateway 25 at an open switch in counterclockwise transport segment 200 corresponding to the channel of the traffic stream. Lightpath 272 terminates at gateway 258 at an open switch in clockwise transport segment 202 corresponding to the channel of the traffic stream.

The ADN 262 traffic stream and the ADN 252 traffic stream may represent different traffic but may be conveyed within the same channel, or wavelength. However, since the ADN 262 traffic stream and the ADN 252 traffic stream are isolated within different subnets. In this way, the overall capacity of the network is increased for that channel, even though channel flexibility is maintained within each subnet.

Either the ADN 262 traffic stream or the ADN 252 traffic stream (each using the same channel) may be assigned a terminable status. "Terminable" in this context means that that stream may be selectively terminated to provide a protection path for the another stream. The other stream may be a protectable stream, "protectable" meaning that it may be protected in the event of an interruption of one of the light paths of that traffic stream via protection switching. The light path of the protectable traffic stream may be termed the "working path" and the light path of the terminable traffic stream may be termed the "protection path." Thus, in the illustrated example, a client adding traffic to the network via ADN 262 may pay a premium for a working path that will be protected in the event of a line cut or other interruption. Such traffic may comprise voice, video, or other real-time or time-sensitive traffic. The client adding traffic to the network at ADN 252 may pay a lesser amount to use the protection path of the premium client of the other subnet, subject to termination if necessary to protect the working path. An example of such protection switching is shown in FIG. 6.

Figure 6:
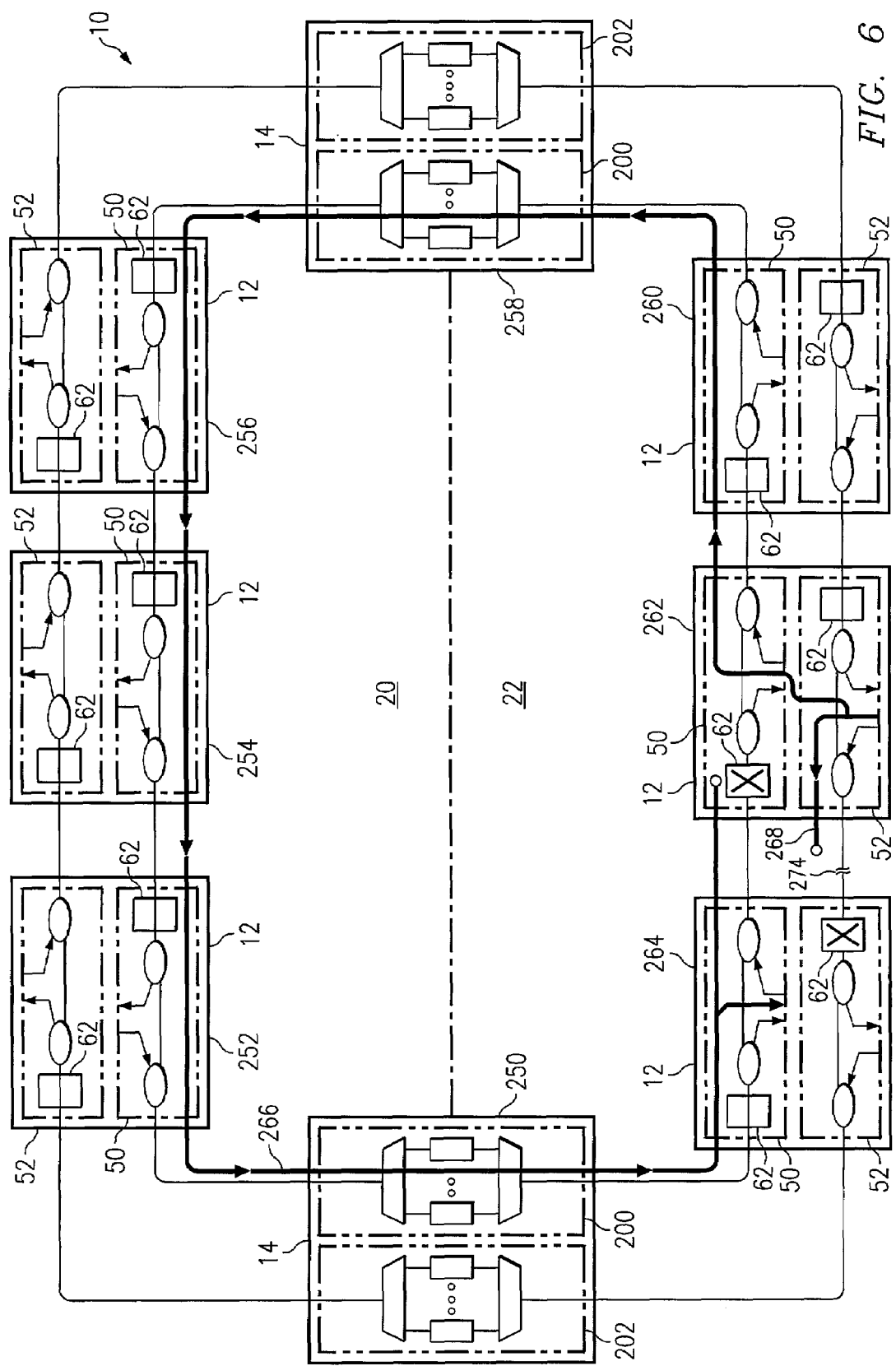
FIG. 6 is a block diagram illustrating protection switching and light path protection of the working light path of FIG. 5 in accordance with one embodiment of the present invention.

FIG. 6 is a block diagram illustrating protection switching and light path protection of the working light path of FIG. 5 in accordance with one embodiment of the present invention. In the example shown in FIG. 6, as described above, the path 268 of the ADN 262 traffic stream from origination node 262 to destination node 264 is dedicated as the working path, whereas the light paths 270 and 272 of the ADN 252 traffic stream are a protection paths. The ADN 252 traffic stream and the ADN 262 traffic stream in the illustrated embodiment are carried on the same channel.

In the illustrated example, the line cut 274 prevents the ADN 262 traffic stream as shown in FIG. 5 from reaching its destination node 264. Specifically, the line cut prevents traffic from travelling on line path 268 to ADN 264. Pursuant to the protection switching protocol, the ADN 252 traffic stream is terminated, and the switches 210 in gateways 258 and 250 corresponding to the wavelength of the ADN 252 traffic stream and the ADN 262 traffic stream are closed, allowing the ADN 262 traffic stream to pass through gateway 258 and enter subnet 20 and be carried in a counterclockwise direction to ADN 264. In this way, each of the destination nodes of the ADN 262 traffic stream receive the ADN 262 traffic stream. In order to ensure an opening in the rings 16 and 18 in the channel of the ADN 262 traffic stream during protection switching, switches 62 in the transport element 50 of ADN 262 and switch 62 in the transport element 52 of ADN 264 are opened. In this way, channel interference is prevented, for example, if the line cut 274 only affects one ring, or during repair operations. In a particular embodiment, for any working channel in a working path interruption, the corresponding protection channel in the protection path is terminated and the switches in the gateways are opened. If work channels are not affected, the system continues as before.

After repair of the line cut, the network is reverted to its pre-protection switching state shown in FIG. 5. Specifically, the switches in gateways 258 and 250 corresponding to the wavelength of the ADN 252 traffic stream and the ADN 262 traffic stream are opened, thus confining the ADN 262 traffic stream to the subnet 22, and the switches 62 in ADNs 262 and 264 are closed. In this way, the "protection path" is recovered. The ADN 252 traffic stream may then be transmitted on paths 270 and 272.

In a particular embodiment, the NMS of the network 10 may be operable to choose the shortest protection path from among a plurality of possible protection paths.

Figure 7:
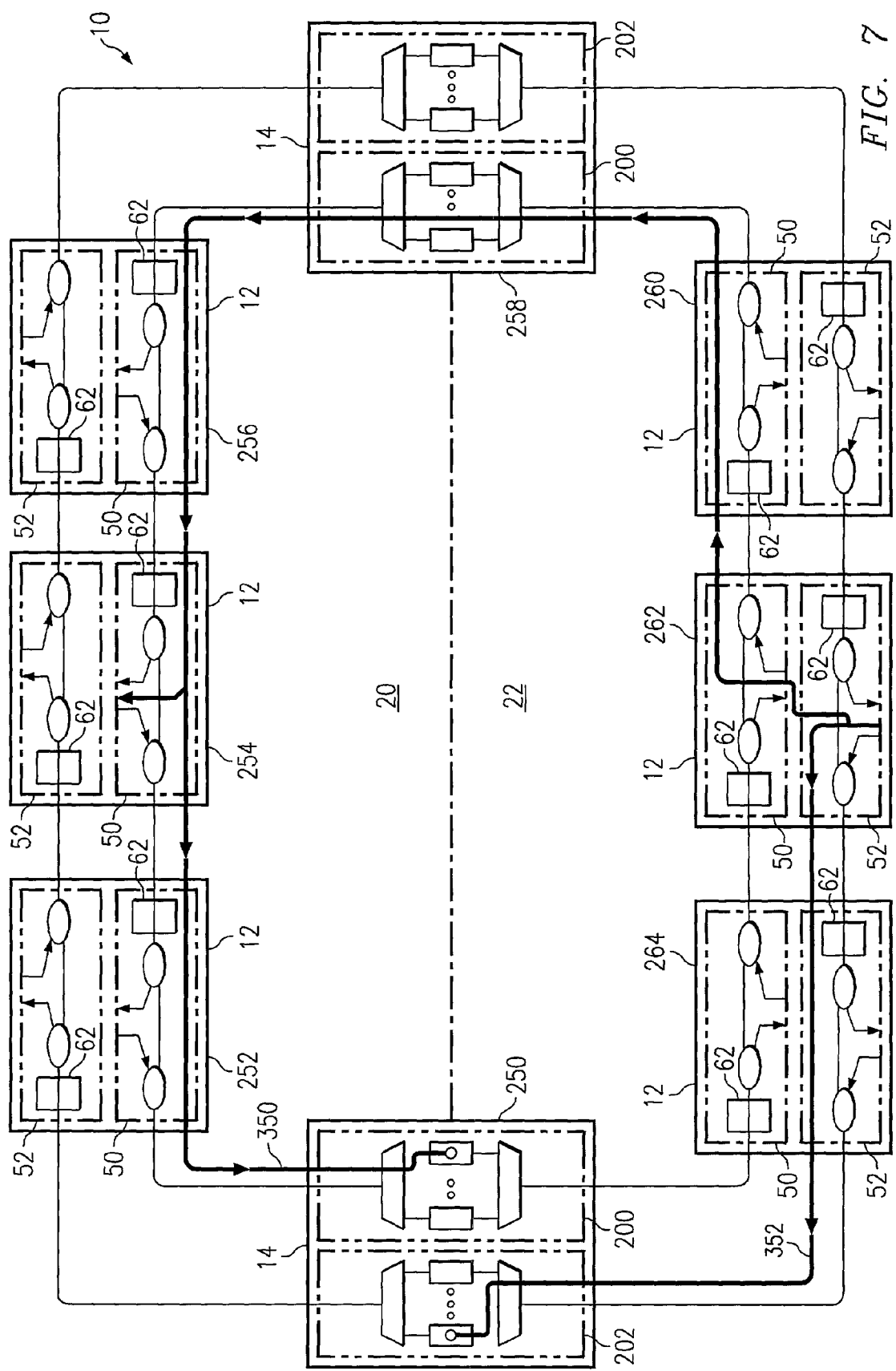
FIG. 7 is a block diagram illustrating a light path of an inter-subnet optical signal of the optical network of FIG. 1 in accordance with another embodiment of the present invention.

FIG. 7 is a block diagram illustrating a light path of an optical signal of the optical network 10 of FIG. 1 in accordance with another embodiment of the present invention. In the embodiment shown in FIG. 7, paths of an exemplary intra-subnet signal is illustrated.

In the embodiment shown in FIG. 7, the ADN 262 traffic stream is an inter-subnet traffic stream carried on light paths 350 and 352, with at least a portion of the light paths carried in both subnets 20 and 22. In the illustrated embodiment, the destination node of the ADN 262 traffic stream is ADN 254. The optical rings 16 and 18 are open for the channel of the ADN 262 traffic stream at switches 210 of gateway 250 corresponding to that channel, but are closed at switches 210 of gateway 258. Switches in the ADNs are in the closed, pass-through state.

Figure 8:
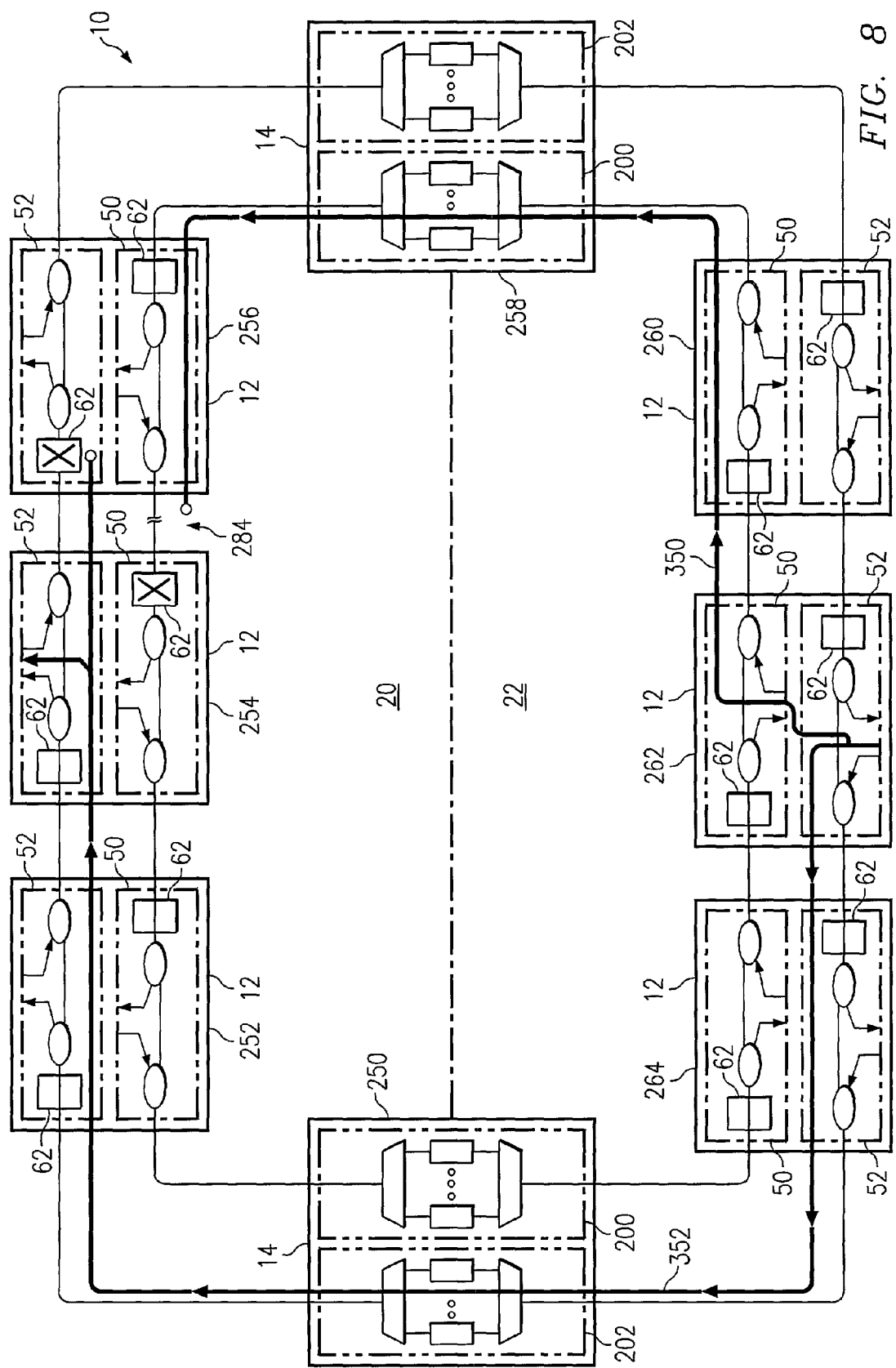
FIG. 8 is a block diagram illustrating protection switching and light path protection of the light path of FIG. 7 in accordance with one embodiment of the present invention.

FIG. 8 is a block diagram illustrating protection switching and light path protection of the working light path of FIG. 7 in accordance with one embodiment of the present invention. In the example shown in FIG. 7, as described above, the ADN 262 traffic stream is an intra-subnet traffic stream.

In the illustrated example, the line cut 284 prevents the ADN 262 traffic stream from reaching its destination node. Specifically, the line cut prevents traffic from travelling on line path 350 to ADNs 254, 252, and 250.

Pursuant to the protection switching protocol, the switches 210 in gateway 250 corresponding to the wavelength of the ADN 262 traffic stream is closed, allowing the ADN 262 traffic stream to pass through gateway 250 and be carried in a clockwise direction to ADNs 254 and 252. In this way, the destination node 254 of the ADN 262 traffic stream receives the ADN 262 traffic stream.

In order to ensure an opening in the rings 16 and 18 in the channel of the ADN 262 traffic stream during protection switching, switches 62 in the transport element 50 of ADN 254 and switch 62 in the transport element 52 of ADN 256 are opened. In this way, channel interference is prevented, for example, if the line cut 274 only affects one ring, or during repair operations.

After repair of the line cut, the network is reverted to its pre-protection switching state shown in FIG. 7. Specifically, the switch in gateway 258 corresponding to the wavelength of the ADN 262 traffic stream is opened and the switches 62 in ADNs 254 and 256 are closed.

FIG. 9 is a flow diagram illustrating a method for transmitting traffic in an optical network in accordance with one embodiment of the present invention.

Referring to FIG. 9, the method for transmitting traffic in an optical network begins with step 400, wherein traffic is passively added and dropped from an optical ring at each of a plurality of ADNs and transported in the ring in a specific wavelength, or channel.

Proceeding to step 402, those traffic channels that have reached their destination ADN are terminated at a plurality of discrete points along the ring. In one embodiment, such termination occurs at the switches of one or more gateways 14, such that the gateways 14 formed the boundaries of subnets within the network. For intra-subnet traffic streams, the source and destination ADNs all are within a subnet. For inter-subnet traffic streams, the source and destination ADNs may be within two or more subnets.

Proceeding to step 404, traffic channels that have not reached all their destination add/drop nodes are forwarded through the gateways to allow the destination node to be reached. It will be understood that the gateway may be reconfigured to pass and terminate certain specified wavelengths and thus not dynamically whether a traffic stream has or has not reach its destination. Such forwarding may occur in the ordinary course for inter-subnet traffic. In addition, as described in reference to FIG. 6, gateways may forward intra-subnet traffic so as to protect that traffic in the event of a line cut or other interruption.

At step 406, it is ensured that no channel interference is occurring. In a particular embodiment, this may be accomplished by confirming that the gateways are configured to not pass through channels which would interfere with the intended network traffic.

FIG. 10 is a flow diagram illustrating a method for protection switching for the optical network of FIG. 1 in accordance with one embodiment of the present invention. As described above in reference to FIG. 1, the network comprising a first optical ring and a second optical ring and a plurality of subnets and the traffic carried within a signal comprising a wavelength.

Referring to FIG. 10, the method begins with step 450 wherein an line cut or other interruption in the working path of a high-priority traffic stream is detected. An interruption may be any event causing one or more channels to not reach their destination over a working or existing path. The detection may be via a loss-of-light alarm received at the EMS 124 of an ADN adjacent to the interruption. The EMS 124 may process the error message and forward the message to NMS 126, which may process the commands necessary to complete the remainder of the method and transmit those commands to the EMSs 124 of the ADNs 12 and the gateways 14.

Proceeding to step 452, the interruption is isolated. In a particular embodiment, the NMS 126 directs the EMS 124 of the ADN 12 downstream of the interruption in the clockwise direction to open the switch 62 in clockwise transport element 52 and the switch 62 in counterclockwise element 50. Thus, in the example shown in FIG. 6, the switches 62 in the ADNs 262 and 264 are opened as shown in response to the line cut 274. Opening the switches 62 at these adjacent locations may prevent channel interference, for example, if the line cut 274 only affects one ring, or during repair operations.

Proceeding to step 454, terminable traffic is corresponding to the working paths which are to be protected, terminated along the protection path. Terminable traffic may remain if the corresponding working path is not interfered with by a fiber cut or other interruption. In a particular embodiment, the NMS 126 directs the EMS 124 of any ADNs 12 in another subnet transmitting traffic in the same channel as the high-priority traffic stream to cease adding traffic to the network.

Proceeding to step 456, the gateways are reconfigured to allow the protected traffic to proceed along the protection path. In a particular embodiment, this may be accomplished by closing the previously-opened switches 210 corresponding to that wavelength in the gateway or gateways 14 along the protection path. The gateways may be otherwise suitably reconfigured by mechanical, electrical, optical or other means to establish protection paths between subnets. The gateway and the other nodes and elements may be controlled locally or remotely by logic or otherwise.

At step 458, the protected traffic is forwarded along the protection path to its destination node or nodes. At decisional step 460, it is determined whether the interruption has been repaired. If not, the method returns to step 458 and the protection path continues to carry the protected traffic. If the interruption has been repaired, the method proceeds to step 462 wherein the network is reverted to its pre-interruption state, such reversion comprising closing the opened switches and again adding the terminable traffic to its channel in the network. Upon reversion the method may repeat in response to at least detection of another interruption.

FIG. 11 is a block diagram illustrating an optical network in accordance with another embodiment of the present invention. Specifically, FIG. 11 represents an embodiment the present invention operable for a network with three subnets, instead of the two subnets of FIG. 1. It will be understood that the present invention, in the particular embodiment shown in FIGS. 11-17, may be utilized in networks with two, three, or more subnets.

Referring to FIG. 11, the network 500 includes a first fiber optic ring 510 and a second fiber optic ring 512 connecting a plurality of add/drop nodes (ADNs) 508 and optical wavelength reuse gateways 514. As with the network 10 of FIG. 1, network 500 is an optical network in which a number of optical channels are carried over a common path at disparate wavelengths, may be an wavelength division multiplexing (WDM), dense wavelength division multiplexing (DWDM), or other suitable multi-channel network, and may be used in a short-haul metropolitan network, and long-haul inter-city network or any other suitable network or combination of networks.

In network 500, also as in network 10 of FIG. 1, optical information signals are transmitted in different directions on the rings 510 and 512 to provide fault tolerance. The optical signals have at least one characteristic modulated to encode audio, video, textual, real-time, non-real-time and/or other suitable data. Modulation may be based on phase shift keying (PSK), intensity modulation (IM) and other suitable methodologies.

In the illustrated embodiment, the first ring 510 is a clockwise ring in which traffic is transmitted in a clockwise direction. The second ring 512 is a counterclockwise ring in which traffic is transmitted in a counterclockwise direction. The ADNs 508 are similar to the ADNs 12 of FIG. 2 in that each are operable to add and drop traffic to and from the rings 510 and 512 and comprise transport elements 50 and 52, and a managing element 110. However, in one embodiment, in place of combining element 130 in ADN 508 is a divided combining element (DCE). A DCE, described in further detail and in various embodiments in FIGS. 12A-12B, may be provisioned to forward a first specified subset of the total channels originating from the ADN 508 to first ring 510 and a second specified subset of the total channels to the second ring 512. Switches in the DCE may allow for a particular traffic stream to be selectively forwarded to a different ring during protection switching. Also, in one embodiment, in place of distributing element 80 in ADNs 508 is a divided distributing element (DDE). A DDE, as described in further detail and in various embodiments in FIGS. 13A-13B, may be provisioned to receive traffic from ring 510 in a first subset of receivers, and traffic from ring 512 in a second subset of receivers. Whereas in the embodiment shown in FIG. 2 the combining element forwards traffic to both rings simultaneously and each receiver of the distributing element receives traffic from both rings, in the DDE/DCE embodiments, individual traffic channels may be forwarded to the clockwise ring or to the counterclockwise ring by the DCE, and received by the DDE from the clockwise ring or from the counterclockwise ring. During protection switching, the DCE may switch from forwarding a particular channel from one ring to the other. In this way, the DDE/DCE equipped ADNs 508 allow for three or more protection-switchable subnets.

In one embodiment, network 500 may carry 40 channels, with the odd-numbered channels comprising channels $\lambda_1$, $\lambda_3$, $\lambda_5$, $\lambda_7$, etc., through $\lambda_{39}$ and the even numbered channels comprising channels $\lambda_2$, $\lambda_4$, $\lambda_6$, $\lambda_8$, etc., through $\lambda_{40}$. In accordance with this embodiment, the DCE may be provisioned to, during normal operations, forward higher priority traffic in odd-numbered channels to clockwise ring 510 and in even-numbered channels to counterclockwise ring 512. Lower-priority, terminable traffic may be forwarded by the DCE in even-numbered channels to clockwise ring 510 and in odd-numbered channels to counterclockwise ring 512. In the event of a line cut or other interruption, and as described further below in reference to FIGS. 15 and 16, the DCE may switch interrupted high priority traffic to the other direction on the other ring. Wavelength assignment may be based on the shortest path from origination node to destination node.

Similar to the ADN 12 of FIG. 2, each ADN 508 receives traffic from the rings 510 and 512 and drops traffic destined for the local clients. In adding and dropping traffic, the ADNs 508 may multiplex data from clients for transmittal in the rings 510 and 512 and may demultiplex channels of data from the rings 510 and 512 for clients. Traffic may be dropped by making the traffic available for transmission to the local clients. Thus, traffic may be dropped and yet continue to circulate on a ring. Again, similar to the ADN 12 of FIG. 2, the transport elements of the ADNs 508 communicate the received traffic on the rings 510 and 512 regardless of the channel spacing of the traffic—thus providing "flexible" channel spacing in the ADNs 508.

Rings 510 and 512 and the ADNs 508 are subdivided into subnets 502, 504, and 506, with the gateways 514 forming the subnet boundaries. The gateways may comprise gateways 14 of FIG. 4A or other suitable gateways. During protection switching, as described in further detail below in reference to FIGS. 15 and 16, the gateways 514 may be reconfigured to allow protected traffic to pass through.

As described with the network 10 of FIG. 1, each ring 510 and 512 is open at least one point for each channel, and the rings 510 and 512 may, in response to a line cut or other interruption, be provisioned to terminate in ADNs 12 adjacent to the interruption using 2×2 switches in ADNs 12. As with network 10, network 500 may comprise both intra-subnet traffic and inter-subnet traffic.

In accordance with the embodiments shown in FIGS. 11-16, it may be possible to increase the capacity of a network by up to twice the number of gateways in the network. For example, a three-subnet network as illustrated in FIG. 11 with three gateways may have a capacity of up to six times the capacity of a network without such a subnet configuration. A four-subnet network with four gateways may have a capacity of up to eight times the capacity of a network without such a subnet configuration.

In accordance with another embodiment of the present invention, node 12 of FIG. 2 may be further modified such that 2×2 switch 63 may be placed between drop coupler 58 and add coupler 72, and 2×2 switch 65 may be placed between drop coupler 82 and add coupler 84. In this way, in the event of protection switching which opens switches 62, traffic may still reach the drop couplers 58 and 82.

Figure 12A:
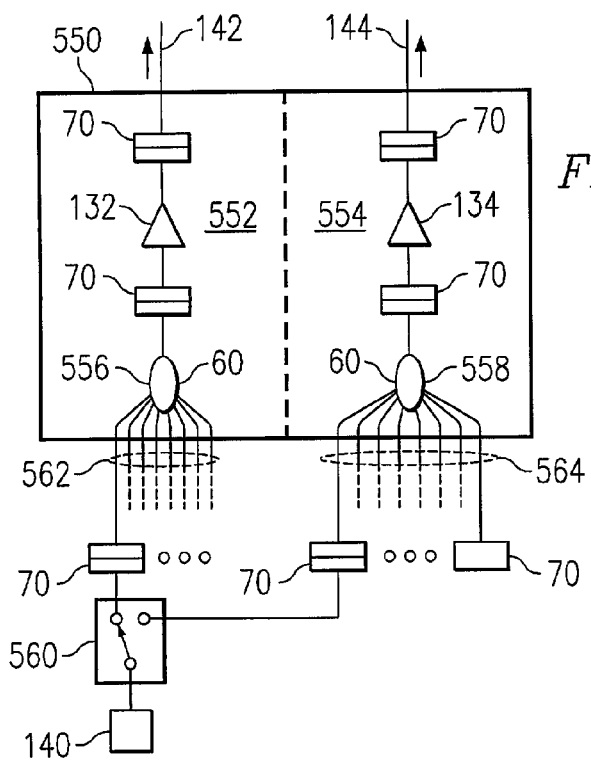
FIG. 12A is a block diagram illustrating a combining element of an add/drop node of FIG. 11 in accordance with one embodiment of the present invention.

FIG. 12A is a block diagram illustrating a divided combining element (DCE) of an add/drop node of the network of FIG. 11 in accordance with one embodiment of the present invention. In the embodiments shown in FIGS. 12A and 12B, the DCE comprises two separate or separable combining elements, each of which receive traffic from a different fiber or direction.

Referring to FIG. 12A, DCE 550 comprises a clockwise amplified combiner 552 and a counterclockwise amplified combiner 554. Clockwise amplified combiner 552 comprises amplifier 132, as described above in reference to FIG. 2, and splitter 556 with a plurality of optical fiber add leads 562. Counterclockwise amplified combiner 554 comprises amplifier 134, as described above in reference to FIG. 2, and splitter 558 with a plurality of optical fiber add leads 564.

Optical senders 140, described above in reference to FIG. 2, may be associated with a local client and are each coupled to one of a plurality of switches 560. Switches 560 are operable to forward traffic to either clockwise amplified combiner 552 or to counterclockwise amplified combiner 554. Each traffic stream may be associated with a dedicated transmitter. Because traffic streams may be directed to one of two ring directions, two different traffic streams may, in one embodiment, be transmitted on the same wavelength but in different directions.

In operation, an optical signal may be transmitted from optical sender 140 to switch 560, forwarded by switch 560 to one of combiner 552 or combiner 554, combined with other signals, amplified, and forwarded to clockwise ring 510 via lead 142 or to counterclockwise ring 512 via lead 144.

For purposes of protection switching, optical signals may be either terminated at optical sender 140 or the direction of the optical signal changed via switch 560. Further details regarding protection switching is described in reference to FIGS. 14-16.

Figure 12B:
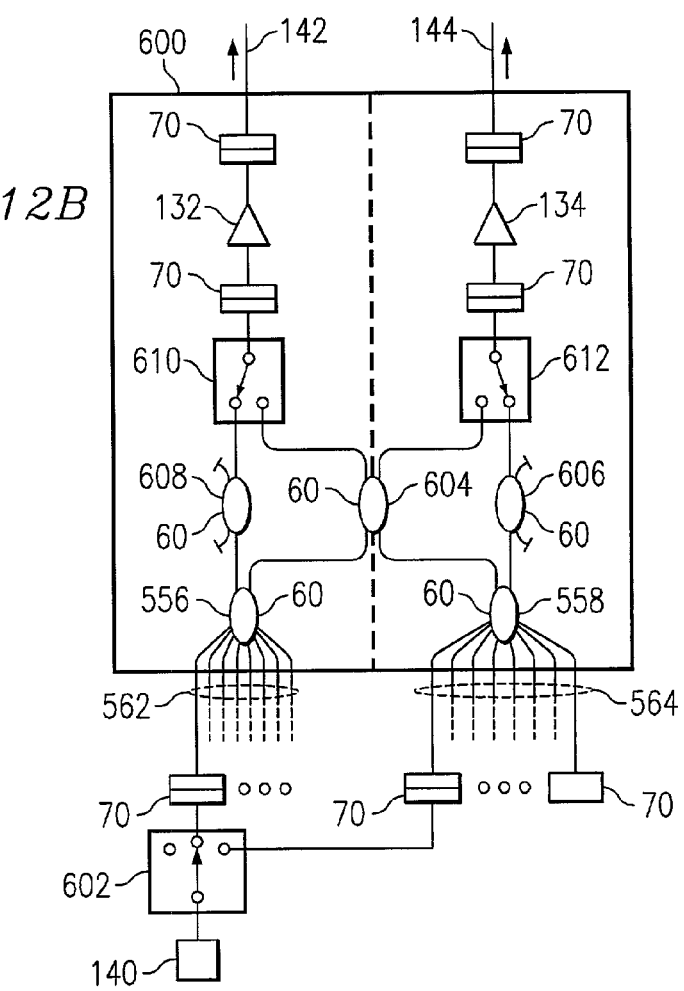
FIG. 12B is a block diagram illustrating a combining element of an add/drop node of FIG. 11 in accordance with another embodiment of the present invention.

FIG. 12B is a block diagram illustrating a DCE 600 of an add/drop node of the network of FIG. 11 in accordance with another embodiment of the present invention. In the embodiment shown in FIG. 12B, in contrast to DCE 550 of FIG. 12A which is provisioned to forward a given channel only in one ring direction, DCE 600 of FIG. 12B may be provisioned to either a) forward all channels from optical senders 140 in both directions, or b) to forward a given channel only in one ring direction. This dual functionality enables DCE 600 to be used either as a component in an ADN that is part of a two-subnet network as described in reference to FIGS. 1-8, or as a component of an ADN that is part of a three (or greater number) subnets network as described in reference to FIGS. 11-16.

Referring to FIG. 12B, DCE 600 comprises amplifiers 132 and 134, splitters 556 and 558, and add leads 562 and 564 as described above in reference to FIG. 12A. Switches 610 and 612 may be set in a first position in which signals from all optical senders 140 are transmitted to both clockwise and counterclockwise rings 510 and 512 via splitter 604; or switches 610 and 612 may be set in a second position in which signals from splitter 556 are only forwarded to clockwise ring 510 via lead 142 and signals from splitter 556 are only forwarded to counterclockwise ring 512 via lead 144. When set in the first position, DCE 600 functions in a generally equivalent manner as combining element 130 of FIG. 2. When set in the second position, DCE 600 functions in a generally equivalent manner as DCE 550 of FIG. 12A. Note that switches 610 and 612 are not used for protection switching in the network described in reference to FIGS. 11-16; instead the DCE 600 is provisioned in the second position and remains in the second position whether during normal or protection operations.

Splitters 606 and 608 may ensure that an optical signal has an equivalent coupler loss whether the switches 610 and 612 are set in the first position or the second position.

In the embodiment illustrated in FIG. 12B, two-position switch 560 of DCE 550 has been replaced with three-position switch 602. Three-position switch 602, which may be used in either of the illustrated DCE embodiments, allows for a signal from optical sender 140 to be sent to one of two amplified combiners or to be terminated at switch 602. In this way, a signal can be terminated (for example, if necessary during protection switching) without shutting off the optical sender 140.

Figure 12C:
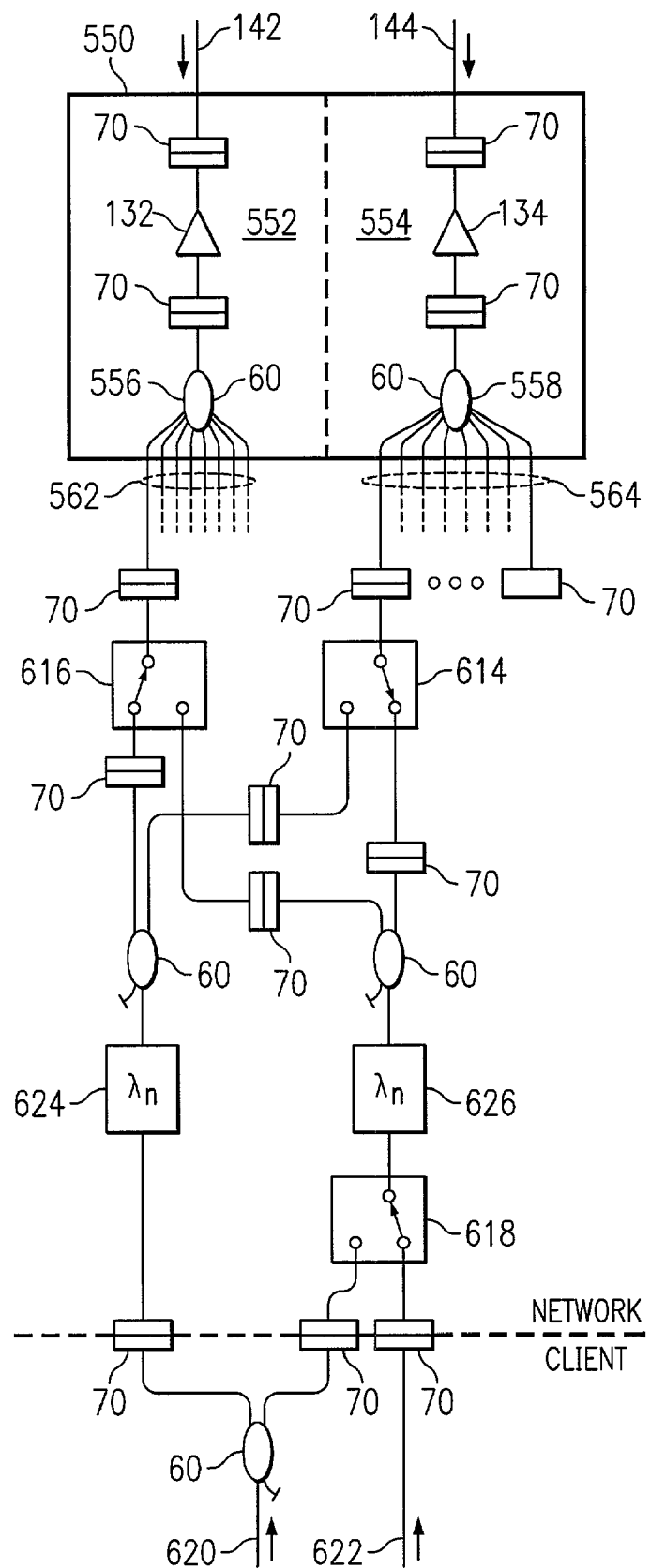
FIG. 12C is a block diagram illustrating the combining element of FIG. 12A with additional provisioning for transponder redundancy.

FIG. 12C is a block diagram illustrating the DCE 550 of FIG. 12A provisioned with features providing for transmitter transponder redundancy. Referring to FIG. 12C, working traffic destined for clockwise amplified combiner 552 may travel via lead 620 to transponder 624 and to leads 562 via switch 616, provisioned as shown. A protection channel may be transmitted via lead 622, switch 618, transponder 626, and switch 614 to leads 564. In the event of a failure of transponder 624, switches 614, 616, and 618 would be switched from their illustrated positions to the alternative position such that traffic from lead 620 may reach lead 562 via transponder 626.

Figure 13A:
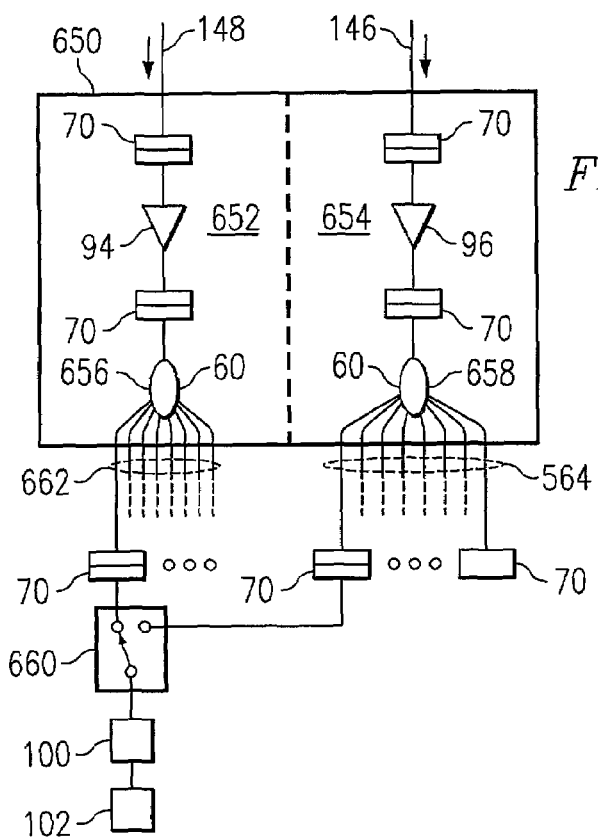
FIG. 13A is a block diagram illustrating a distributing element of an add/drop node of FIG. 11 in accordance with one embodiment of the present invention.

FIG. 13A is a block diagram illustrating a divided distributing element (DDE) of an add/drop node of the network of FIG. 11 in accordance with one embodiment of the present invention. In the embodiments shown in FIGS. 13A and 13B, the DDEs comprises two separate or separable distributing elements, each of which forward traffic to a different fiber or direction.

Referring to FIG. 13A, DDE 650 comprises a clockwise amplified distributor 652 and a counterclockwise amplified distributor 654. Clockwise amplified distributor 652 comprises amplifier 94, as described above in reference to FIG. 2, and splitter 656 with a plurality of optical fiber drop leads 662. Counterclockwise amplified distributor 654 comprises amplifier 96, as described above in reference to FIG. 2, and splitter 658 with a plurality of optical fiber drop leads 664.

Optical filters 100 and receivers 102, described above in reference to FIG. 2, may be associated with a local client and are each coupled to one of a plurality of switches 660. Switches 660 are operable to forward traffic from either clockwise amplified distributor 652 or from counterclockwise amplified distributor 654. Each traffic stream may be associated with a dedicated receiver.

In operation, an optical signal may be dropped from the transport elements 50 or 52 and forwarded to distributors 652 or 654 via drop leads 148 or 146, respectively. The signal is amplified and split by splitters 656 or 658 and forwarded by a switch 660 to an optical filter 100. Optical filter 100 selectively passes a channel to a receiver 102.

For purposes of protection switching, switch 660 is operable such that a given receiver at a destination node during normal operations that receives an optical signal from a first ring may, during protection switching, receive that signal from the second ring. Further details regarding protection switching is described in reference to FIGS. 14-16.

Figure 13B:
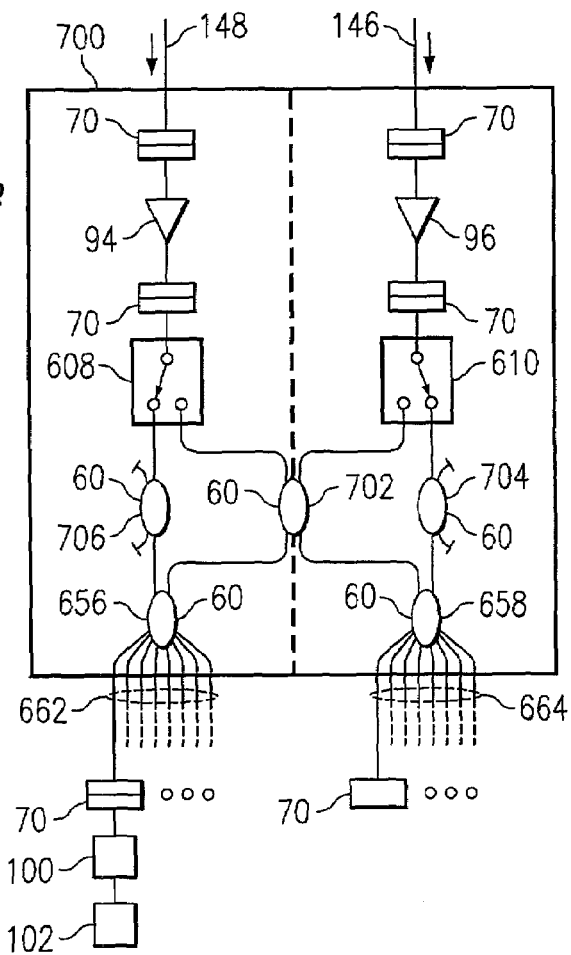
FIG. 13B is a block diagram illustrating a distributing element of an add/drop node of FIG. 11 in accordance with another embodiment of the present invention.

FIG. 13B is a block diagram illustrating a DDE of an add/drop node of the network of FIG. 11 in accordance with another embodiment of the present invention. In the embodiment shown in FIG. 13B, DDE 600 of FIG. 13B may be provisioned to either a) forward all channels from the rings to each of the filters 100, or b) to forward channels from only one ring direction. This dual functionality enables DCE 600 to be used either as a component in an ADN that is part of a two-subnet network as described in reference to FIGS. 1-8, or as a component of an ADN that is part of a three (or greater number) subnets network as described in reference to FIGS. 11-17. The dual functionality also provides for protection switching such that a given receiver may receive a traffic stream from a first ring direction during normal operations, and may receive the traffic from the second ring direction during switching operations.

Referring to FIG. 13B, DDE 700 comprises amplifiers 94 and 96, splitters 656 ad 658, and drop leads 662 and 664 as described above in reference to FIG. 13A. In the illustrated embodiment, drop leads 662 and 664 are connected directly to filters 100. Splitters 704 and 706 may ensure that an optical signal has an equivalent coupler loss whether the switches 608 and 610 are set in the first position or the second position. During normal switching operations at a destination node, switches 608 and 610 may be set in a first position in which signals from both clockwise and counterclockwise rings 510 and 512 are sent to each receiver via coupler 702. During protection switched operations, switches 608 and 610 may be set in a second position in which signals from clockwise ring 510 via lead 148 are only dropped to drop leads 662 via splitter 656, and signals from counterclockwise ring 512 via lead 146 are only dropped to drop leads 664 via splitter 658. Thus, a given receiver may receive a traffic stream from a first ring direction during normal operations, and may receive the traffic from the second ring direction during switching operations. Alternatively, DDE 700 may be provisioned to operate in a generally equivalent manner as distributing element 80 of FIG. 2 and suitable for a two-subnetwork network by setting DDE 700 in the first position for both normal and protection operations.

Figure 14A:
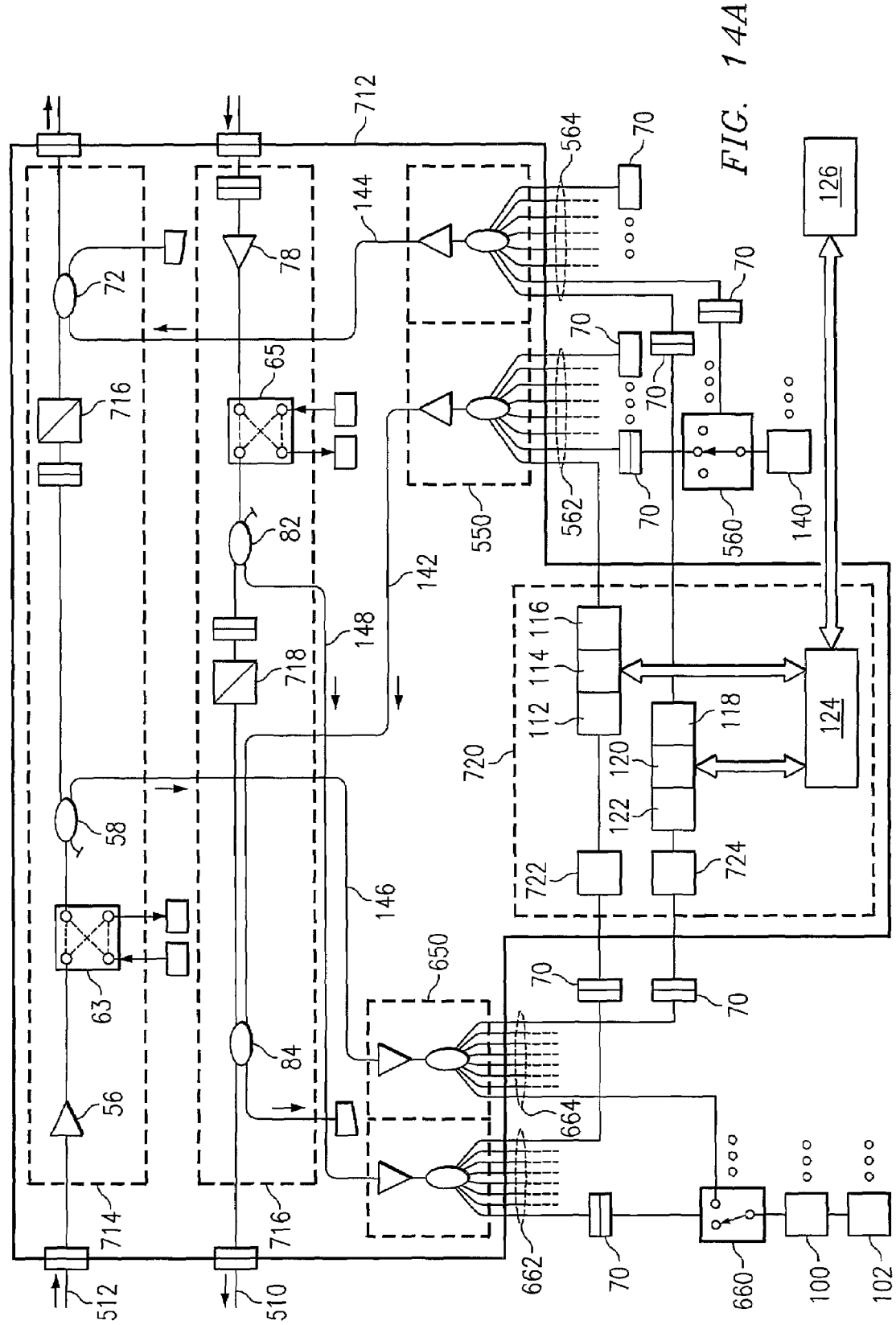
FIG. 14A illustrates details of an add/drop node of the network of FIG. 11 in accordance with another embodiment of the present invention.

FIG. 14A illustrates details of an add/drop node of the network of FIG. 11 in accordance with another embodiment of the present invention. In the embodiment of FIG. 14, OSC signals are transmitted in-band with revenue-generating traffic. The node 712 may in another embodiment, be provisioned for external OSC signals (as illustrated in FIG. 2).

Referring to FIG. 14A, the node 712 comprises DCE 550 and DDE 650 as described above in reference to FIGS. 12A and 13A, respectively. Counterclockwise transport element 714 comprises amplifier 56, switch 63, counterclockwise drop coupler 58, and counterclockwise add coupler 72 as described above in reference to counterclockwise transport segment of FIG. 2. However, in place of OSC filter 54 and 74, a single OSC rejection filter 716 is provisioned between couplers 58 and 72.

Likewise clockwise transport element 716 comprises clockwise drop coupler 82, clockwise add coupler 84, amplifier 78, and switch 65 as described in reference to clockwise transport segment 52 of FIG. 2. However, in place of OSC filter 76 and 86, a single OSC rejection filter 718 is provisioned between couplers 82 and 84.

In this embodiment, in operation, OSC signals are transmitted in-band. OSC receiver 112 is operable to receive the OSC signal from the clockwise ring 510 via one of the drop leads 662 and OSC receiver 122 is operable to receive the OSC signal from the counterclockwise ring 512 via one of the leads 664. Filters 722 and 724 are operable to selectively filter the OSC data from the optical signals distributed by the DDE 650. OSC units 114 and 120 transmit the OSC data to EMS 124 to be processed by NMS 126 as described above in reference to FIG. 2. OSC senders 116 and 118 are operable to transmit the clockwise and counterclockwise signals to the DCE 550, respectively, via one of add leads 562 and one of add leads 564.

Figure 14B:
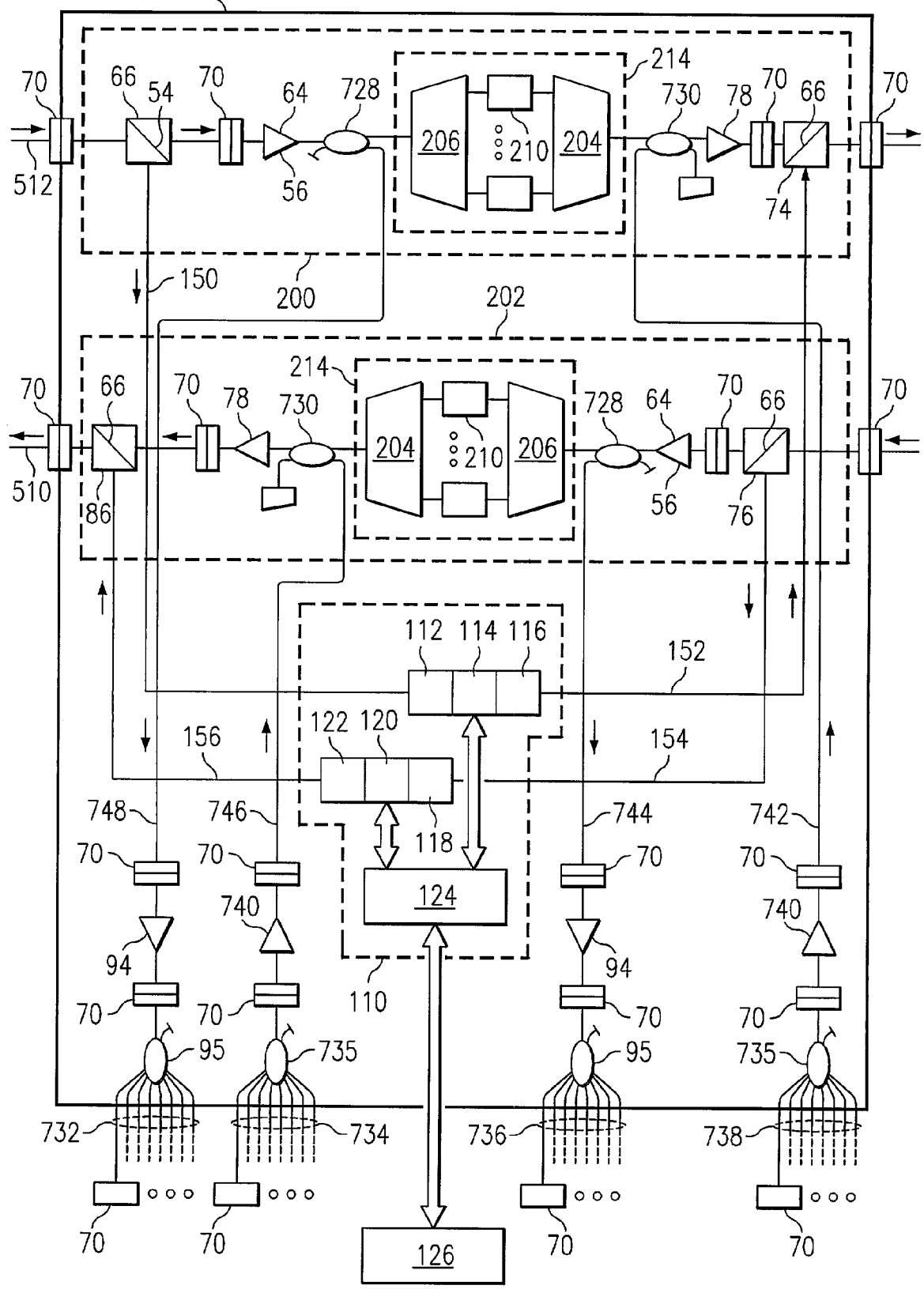
FIG. 14B illustrates details of a gateway node of the network of FIG. 11 in accordance with another embodiment of the present invention.

FIG. 14B illustrates details of a gateway node of FIG. 11 in accordance with another embodiment of the present invention. Gateway 726 of FIG. 14B comprises the elements of gateway 14 of FIG. 4A, but is further provisioned to add and drop traffic from rings 510 and 512 via drop couplers disposed at the ingress side of mux/demux units 214 and add couplers disposed at the egress side of mux/demux units 214. The gateway node of FIG. 14B may be utilized in the embodiments described in reference to FIGS. 11-23 wherein the ADNs utilize DCEs and DDEs.

Referring to FIG. 14B, gateway 726 is provisioned to drop traffic from rings 510 and 512 via drop leads 744 and 748, respectively. From each of rings 510 and 512, traffic may be dropped via a drop coupler 728 to an amplified distributor comprising an amplifier 94, and a splitter 95. Likewise, in the illustrated embodiment, local traffic may be added to ring 510 via lead 746 and to ring 512 via lead 742. Amplified combiners leading to leads 746 and 742 comprise combiners 735 and amplifiers 740, and are operable to combine and amplify the locally-derived traffic. Add couplers 730 coupled to rings 510 and 512 are operable to add the traffic from leads 746 and 742. In accordance with an alternative embodiment, the add/drop functionality of gateway 14 may be omitted.

Figure 15:
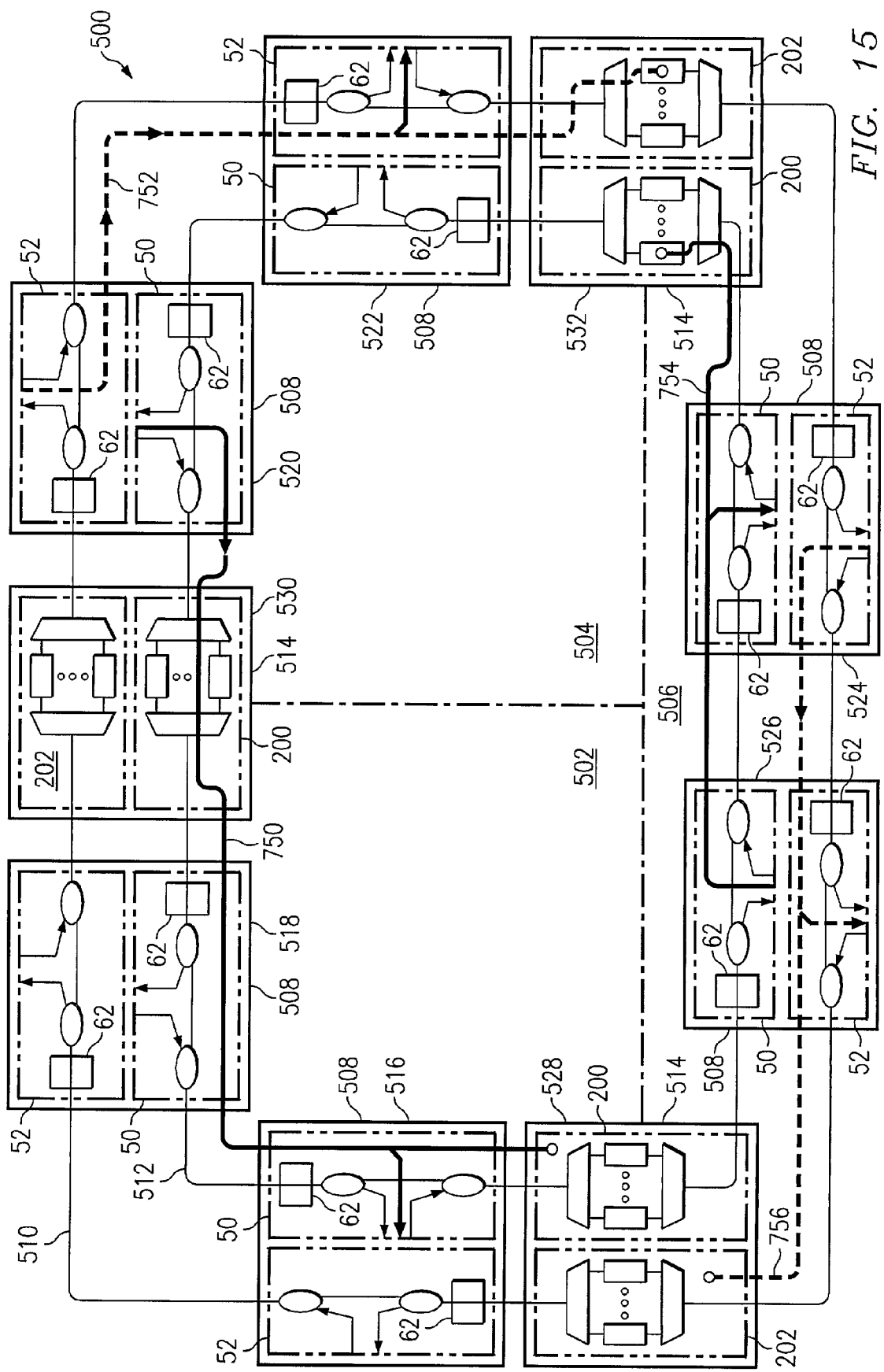
FIG. 15 is a block diagram illustrating light paths of optical signals of the optical network of FIG. 11 in accordance with one embodiment of the present invention.

FIG. 15 is a block diagram illustrating light paths of optical signals of the optical network of FIG. 11 in accordance with one embodiment of the present invention. In FIG. 15, for ease of reference, only high-level details of the transport elements of ADNs 508 and gateways 514 are shown. In addition, ADNs 508 are assigned individual reference numbers, with ADNs 516 and 518 within subnet 502, ADNs 520 and 522 within subnet 504, and ADNs 524 and 526 within subnet 506. Gateways 514, forming the boundary between subnets 502, 504, and 506 are also assigned individual reference numbers 528, 530 and 532.

In the illustrated embodiment, four traffic streams are shown. Traffic stream 750 is a counterclockwise stream originating from ADN 520 and destined for ADN 508. Traffic stream 752 is a clockwise stream originating from ADN 520 and destined for ADN 522. Traffic stream 754 is a counterclockwise stream originating from ADN 526 and destined for ADN 524. Traffic stream 756 is a clockwise stream originating from ADN 524 and destined for ADN 526. Traffic streams 752 and 756 terminate at gateway 514 at an open switch in clockwise transport segment 202 corresponding to the channel of the traffic streams. Traffic streams 750 and 752 terminate at gateway 514 at the open switch in the counterclockwise transport segment 200 corresponding to the channel of the traffic stream. Traffic streams 750, 752, 754, and 756 are carried on the same channel or wavelength; however, the streams are transmitted from a separate optical sender within the DCEs of their respective origination ADNs.

Figure 16:
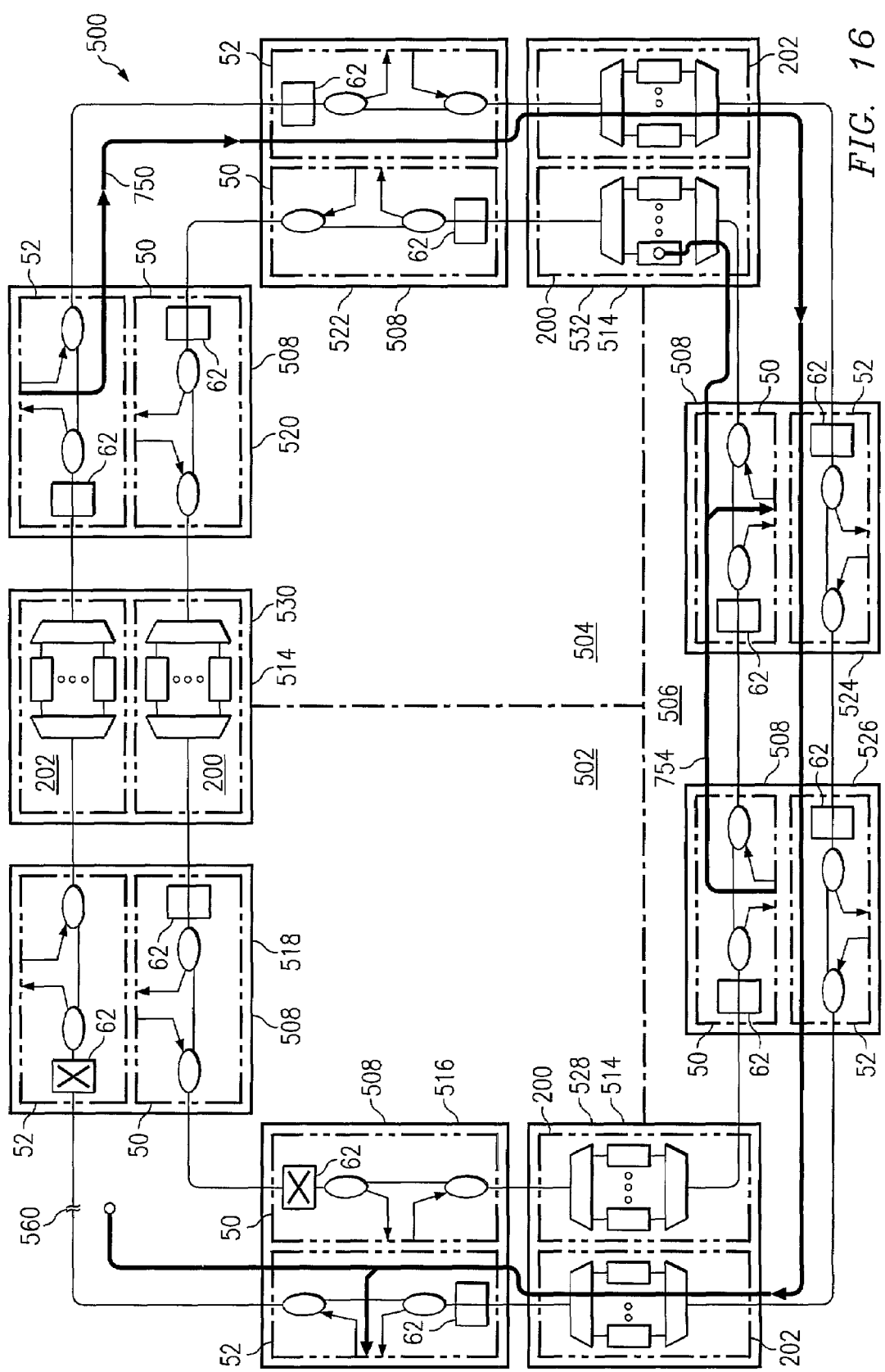
FIG. 16 is a block diagram illustrating protection switching and light path protection of a traffic stream of FIG. 15 in accordance with one embodiment of the present invention.

In the illustrated embodiment, during normal operations, protectable traffic is forwarded in clockwise ring 510 in odd-numbered channels and in even-numbered channels to counterclockwise ring 512. Terminable traffic may be forwarded in clockwise ring 510 in even-numbered channels and in odd-numbered channels to counterclockwise ring 512. Each of the traffic streams 750, 752, 754, and 756 is carried on the same, even-numbered channel ("Channel A"). Channel A may comprise $\lambda_2$ or another even-numbered channel. Thus, traffic streams 750 and 754 are on working paths and may represent higher-priority traffic streams for which a customer has paid a premium, and streams 752 and 756 may represent lower-priority priority on protection paths for which a customer has paid a lower cost. As shown in FIG. 16, streams 752 and 756 may be interrupted during protection switching to protect a higher-priority stream.

FIG. 16 is a block diagram illustrating protection switching and light path protection of the traffic stream 750 of FIG. 14 in accordance with one embodiment of the present invention.

In the event of a line cut or other interruption, an alternate light path is created for protectable channels that are prevented from reaching all of their destination nodes due to the interruption. If the alternate line path would result in interference from traffic in the same channel from other ADNs in other subnets, the DCE 550 in the interfering ADN may terminate that traffic. As previously noted, it will be understood that other divisions of traffic besides odd and even and other conventions may be utilized without departing from the scope present invention.

In the illustrated example, the line cut 560 prevents traffic stream 750 from reaching all of its destination nodes in the path shown on FIG. 15. Pursuant to the protection switching protocol of this embodiment, first, traffic streams 752 and 756 are terminated. Then, the DCE of ADN 520 switches traffic stream 750 from a counterclockwise to a clockwise direction. Traffic streams 752 and 756 are terminated, and the 2×2 switches in gateways 532 and 528 corresponding to Channel A are closed to allow Channel A to pass through. In this way, an alternate path for stream 750 from ADN 520 to ADN 516 is created with no interference from other traffic streams on Channel A.

Depending upon the embodiment of the DCE (as shown in FIGS. 12A, 12B, or in another suitable embodiment), the termination of traffic streams 752 and 756 may be by switching off the optical sender or by switching a three-position switch to a non-forwarding position.

In order to ensure an opening in the rings 510 and 512 during protection switching, switches 62 in the transport element 50 of ADN 516 and switch 62 in the transport element 52 of ADN 518 are opened. In this way, channel interference is prevented, for example, if the line cut 560 only affects one ring, or during repair operations.

After repair of the line cut, the network is reverted to its pre-protection switching state shown in FIG. 15. Specifically, the switches in gateways 528 and 532 corresponding to Channel A are opened and the switches 62 in ADNs 516 and 518 are closed. Traffic stream 750 is reverted to a counterclockwise direction, and traffic streams 752 and 756 may restart.

Figure 17:
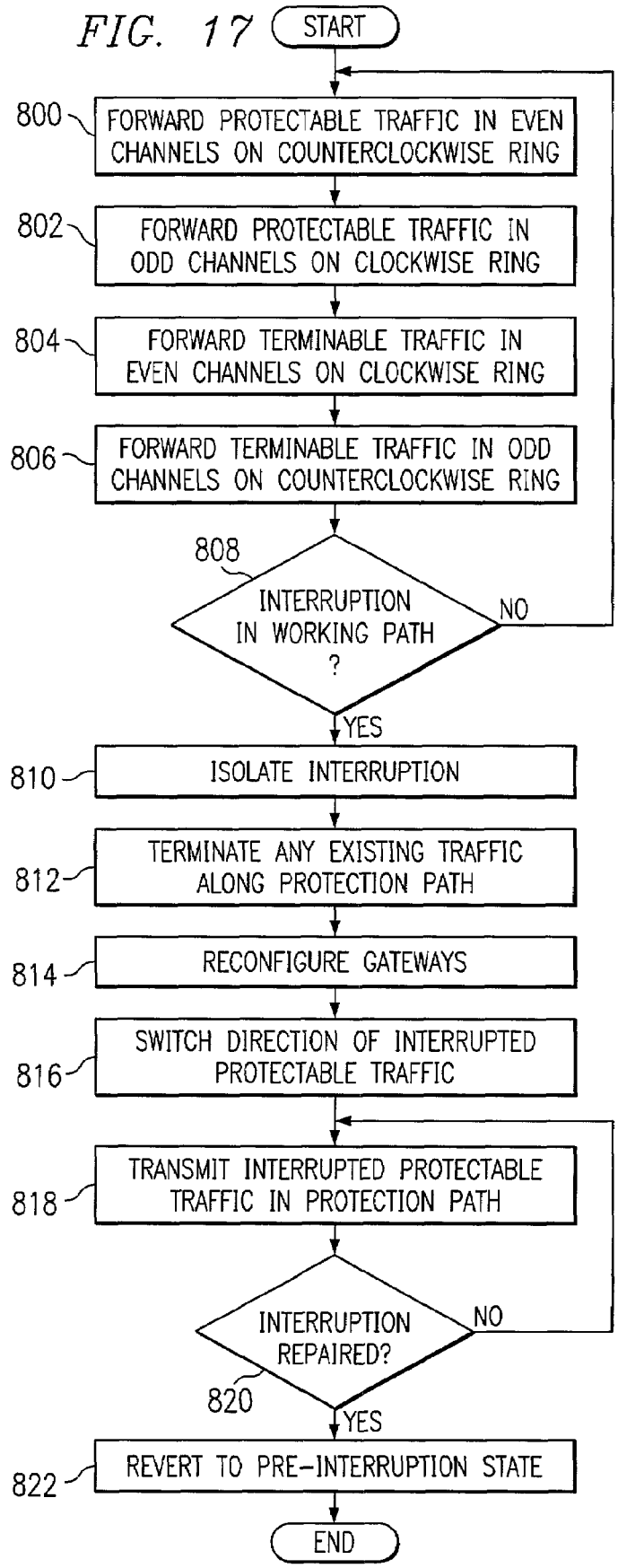
FIG. 17 is a flow diagram illustrating a method for protection switching in an optical ring network in accordance with one embodiment of the present invention.

FIG. 17 is a flow diagram illustrating a method for protection switching for the optical network of FIG. 11 in accordance with one embodiment of the present invention.

Referring to FIG. 17, the method begins with step 800 wherein a first set of protectable traffic streams are forwarded in even channels in the counterclockwise ring. Proceeding to step 802, a second set of protectable traffic streams are forwarded in odd channels on the clockwise ring. At step 804, a first set of terminable traffic is forwarded in even channels in the clockwise ring, and, at step 806, a second set of terminable traffic is forwarded in odd channels in the counterclockwise ring. In this way, each channel in each direction is occupied by a traffic stream, thus efficiently utilizing network capacity. In a particular embodiment, the protectable traffic streams are higher priority traffic streams for which a customer has paid a premium, whereas the terminable traffic streams are lower priority traffic streams.

At decisional step 808, it is determined whether has been an interruption of a working path of a protectable traffic stream. Such interruption may comprise a line cut or other interruption that prevents the protectable traffic stream from reaching all of its destination nodes. If no interruption has occurred, the method returns to step 800. If an interruption has occurred, then, at step 810, the interruption is isolated. In a particular embodiment, the isolation of the interruption comprises opening the clockwise ring 510 at the add/drop node clockwise of the interruption by opening the switch 62 in the clockwise transport element, and opening the counterclockwise ring at the add/drop node counterclockwise of the interruption by opening the switch 62 in the counterclockwise transport element.

Proceeding to step 812, any existing, terminable traffic is terminated along the protection path. At step 814, the gateways are reconfigured to allow the protected traffic to proceed along the protection path. In a particular embodiment, this may be accomplished by closing the previously-opened switches 210 corresponding to that wavelength in the gateway or gateways 514 along the protection path.

Proceeding to step 816, a switch in the DCE of the origination ADN of the interrupted traffic switches the direction of the interrupted traffic. At step 818, the interrupted traffic is transmitted in the protection path. At decisional step 820, it is determined whether the interruption has been repaired. If the interruption has not been repaired, the method returns to step 818 and the interrupted traffic continues to be transmitted in the protection path. If the interruption has been repaired, the method proceeds to step 822 wherein the network is reverted to its pre-interruption state, and the method has reached its end.

Figure 18:
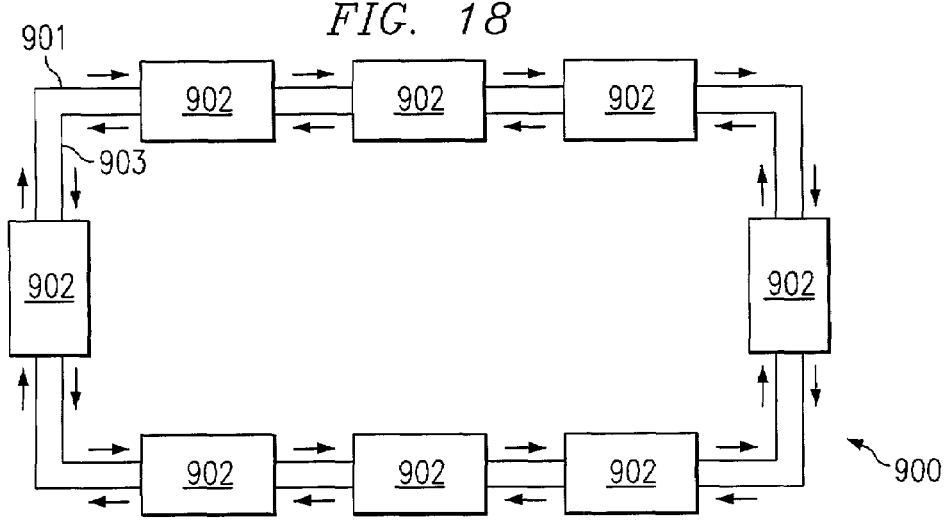
FIG. 18 is a block diagram illustrating an optical network in accordance with yet another embodiment of the present invention.

FIG. 18 is a block diagram illustrating another embodiment of an optical network. In the embodiment shown in FIG. 18, the network 900 comprises a plurality of add/drop nodes 902 and a hub node 904. Clockwise ring 901 and counterclockwise ring 903 connect the nodes.

Add/drop nodes 902 may each comprise an add/drop node 12 as described in reference to FIG. 2 or another suitable add/drop node. Hub node 904 may comprise a gateway node 14 as described in reference to FIG. 4A or another suitable gateway node.

Switches within gateway node 904 may be open for specific wavelengths during normal operations, thus opening the network at the gateway node and preventing signal interference. The switches may also allow for protection switching of a traffic stream in the event of a line cut or other interruption. In the event of such an interruption, the traffic stream may be able to reach its destination node by travelling along the opposite direction as during normal operations and passing through a previously open switch which is closed for protection switching, allowing the traffic stream to pass through the gateway and to reach the destination node.

In another embodiment, the add/drop nodes 902 may comprise DDEs and DCEs, allowing for separation of traffic received from and forwarded to the clockwise and counterclockwise rings. In this embodiment, such separation allows for a given wavelength to be used as a working path in one direction and a protection channel access (PCA) in the other direction and thus may increase overall network capacity by up to two times, while still providing for protection switching functionality.

Network 900 may be particular suitable for connection to existing long-haul or metro-core networks, which may be provisioned to easily connect through a hub node. In addition, 900 may be easily upgradable to a network with 2, 3 or more subnets in accordance with the embodiments previously described.

FIG. 19 is a block diagram illustrating light paths of optical signals of the optical network of FIG. 18 in accordance with one embodiment of the present invention. For ease of reference, only high-level details of the transport elements of ADNs 902 and hub node 904 are shown. In the embodiment shown in FIG. 19, ADNs 902 comprise DCE 600 and DDE 700, the switches in each of DCE 600 and DDE 700 provisioned to transmit the same traffic in both the clockwise and counterclockwise directions. Alternatively, ADNs 902 may, in the embodiment shown in FIG. 19, comprise combining element 130 and distributing element 80 of FIG. 2, or other suitable combining or distributing elements.

Referring to FIG. 19, lightpaths 910 and 912 represent a traffic stream added to the network from an origination node ADN 906 (the "ADN 906 traffic stream") in the counterclockwise and clockwise directions, respectively. In the embodiment shown in FIG. 19, the intended destination node of the ADN 906 traffic stream is ADN 908. Lightpath 922 terminates at hub node 904 at an open switch (or "cross" state of 2×2 switch) in clockwise transport segment 202 corresponding to the channel of the traffic stream. Lightpath 920 also terminates at hub node 904 in counterclockwise transport segment 202 at an open switch in counterclockwise transport segment 200 corresponding to the channel of the traffic stream. It will be noted that, although FIG. 19 shows node 908 as the destination node, the traffic also reaches the drop ports of ADNs 910, 912, 914, 916, and 918. Thus, the network has a broadcasting function.

Figure 20:
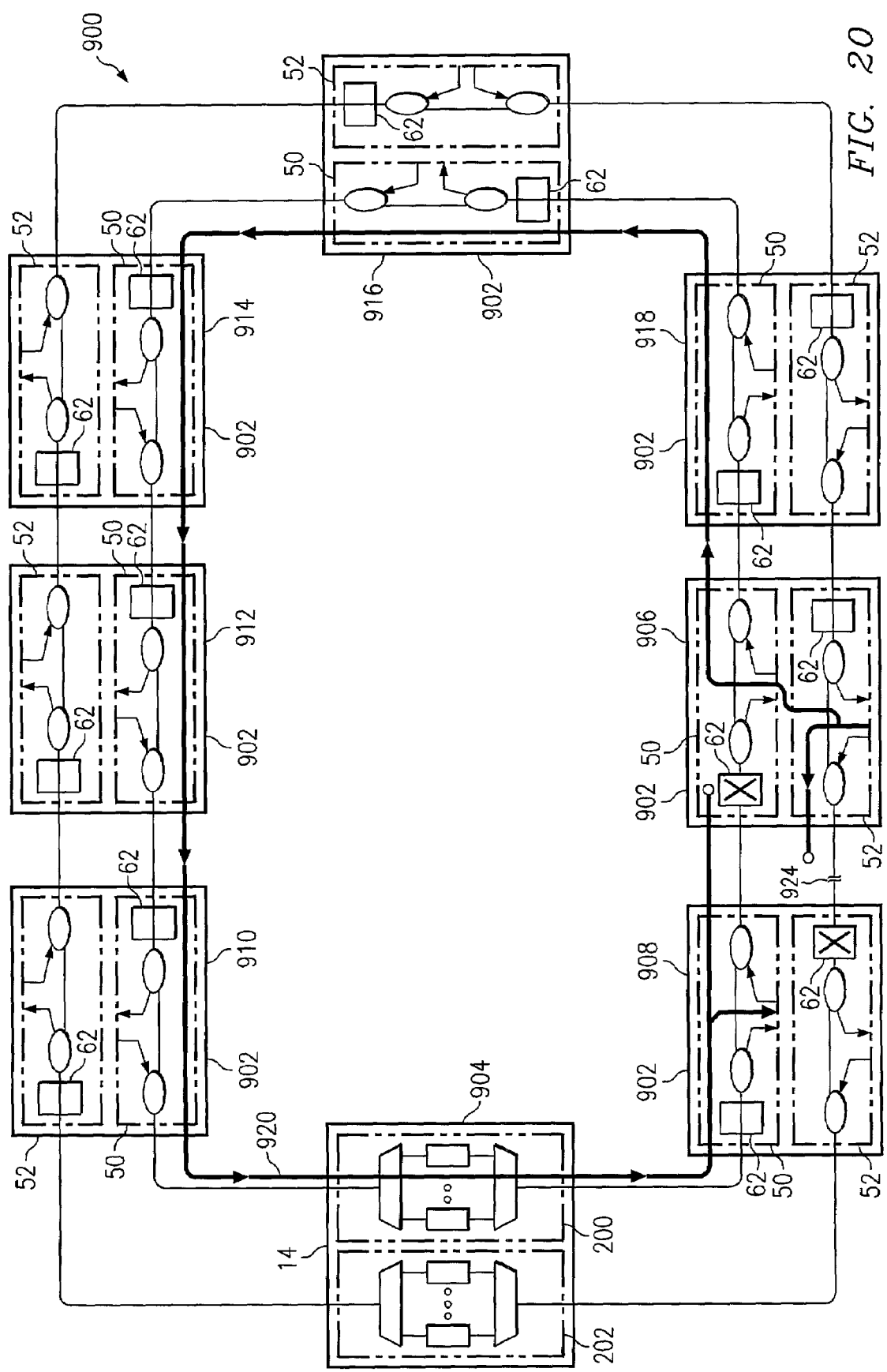
FIG. 20 is a block diagram illustrating protection switching of the optical network of FIG. 19 in accordance with one embodiment of the present invention.

FIG. 20 is a block diagram illustrating protection switching and light path protection of the light path of FIG. 19 in accordance with one embodiment of the present invention. Line cut 924 prevents the ADN 906 traffic stream as shown in FIG. 19 from reaching its destination node 908. Pursuant to the protection switching protocol, switches 210 in hub node 904 corresponding to the wavelength of the ADN 906 traffic stream are closed, allowing the ADN 906 traffic stream to pass through hub node 904. In this way, destination node 908 of the ADN 906 traffic stream receives the ADN 906.

In order to ensure an opening in the rings 901 and 903 in the channel of the ADN 906 traffic stream during protection switching, switch 62 in the transport element 50 of ADN 906 and switch 62 in the transport element 52 of ADN 908 may be opened. In this way, channel interference is prevented, for example, if the line cut 924 only affects one ring, or during repair operations. After repair of the line cut, the network is reverted to its pre-protection switching state shown in FIG. 19.

Figure 21:
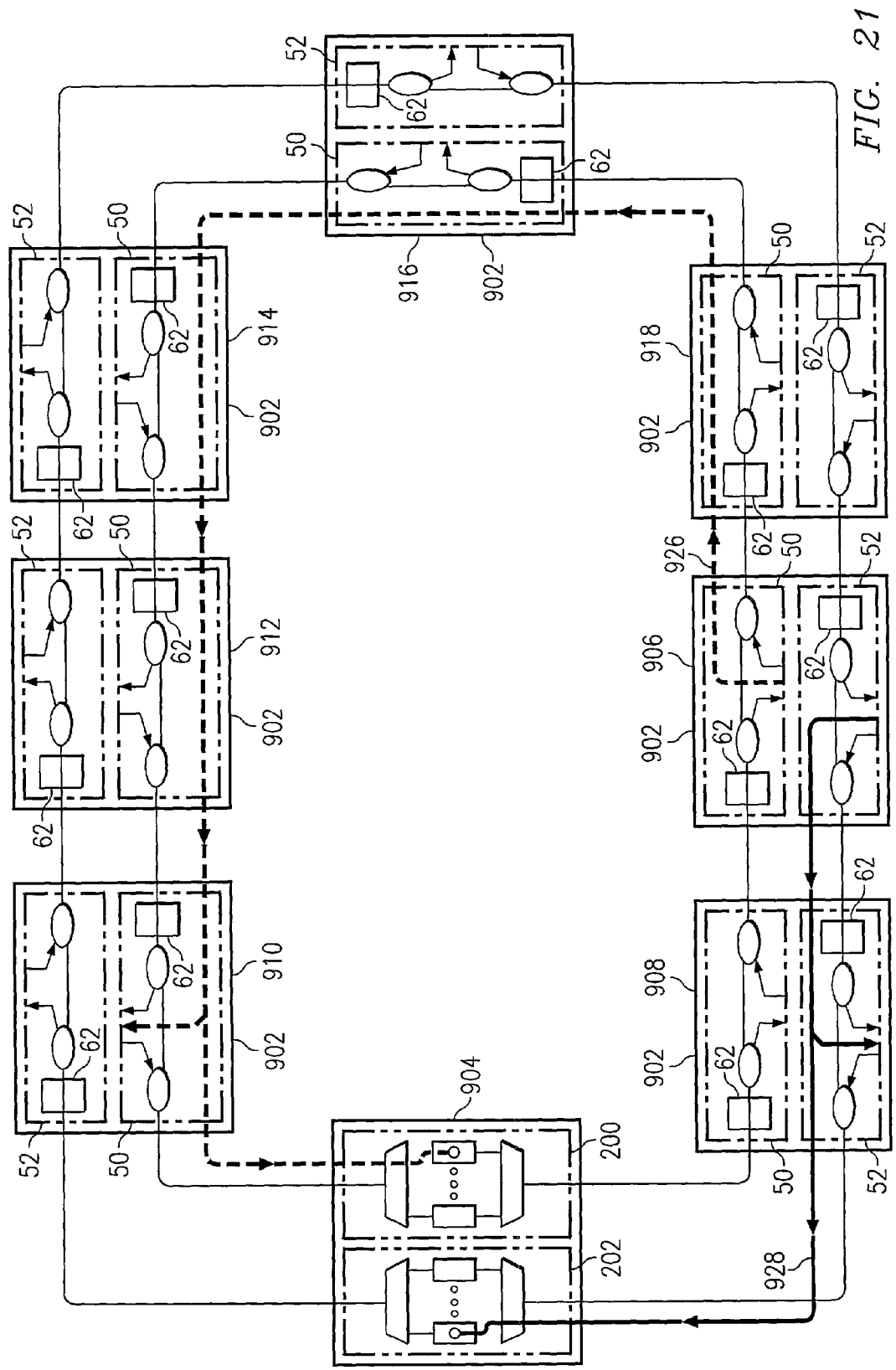
FIG. 21 is a block diagram illustrating light paths of optical signals of the optical network of FIG. 18 in accordance with another embodiment of the present invention.

FIG. 21 is a block diagram illustrating light paths of optical signals of the optical network of FIG. 18 in accordance with another embodiment of the present invention. In the embodiment shown in FIG. 21, ADNs 902 comprise DCE 600 and DDE 700, the switches in each of DEC 600 and DDE 700 provisioned to transmit a first traffic stream in the clockwise direction and a second traffic stream in the counterclockwise directions. Alternatively, ADNs 902 may, in the embodiment shown in FIG. 19, comprise DCE 550 of FIG. 12A and DDE 650 of FIG. 13A, or other suitable divided combining or divided distributing elements.

Referring to FIG. 21, lightpath 928 represents the first, or clockwise, traffic stream added to the network from origination node ADN 906 with ADN 908 as its destination node. Lightpath 926 represents a second, or counterclockwise, traffic stream added to the network from origination node 906 with ADN 910 as its destination node As described above in reference to FIGS. 11-17, first lightpath 928 may comprise a working lightpath which may comprise a protectable traffic stream. Second lightpath 926 may comprise a protection channel access (PCA) lightpath comprising, during normal operations, a terminable traffic stream. Lightpath 928 terminates at hub node 904 at an open switch (or "cross" state of 2×2 switch) in clockwise transport segment 202 corresponding to the channel of the traffic stream. Lightpath 926 also terminates at hub node 904 in counterclockwise transport segment 202 at an open switch in counterclockwise transport segment 200 corresponding to the channel of the traffic stream.

Figure 22:
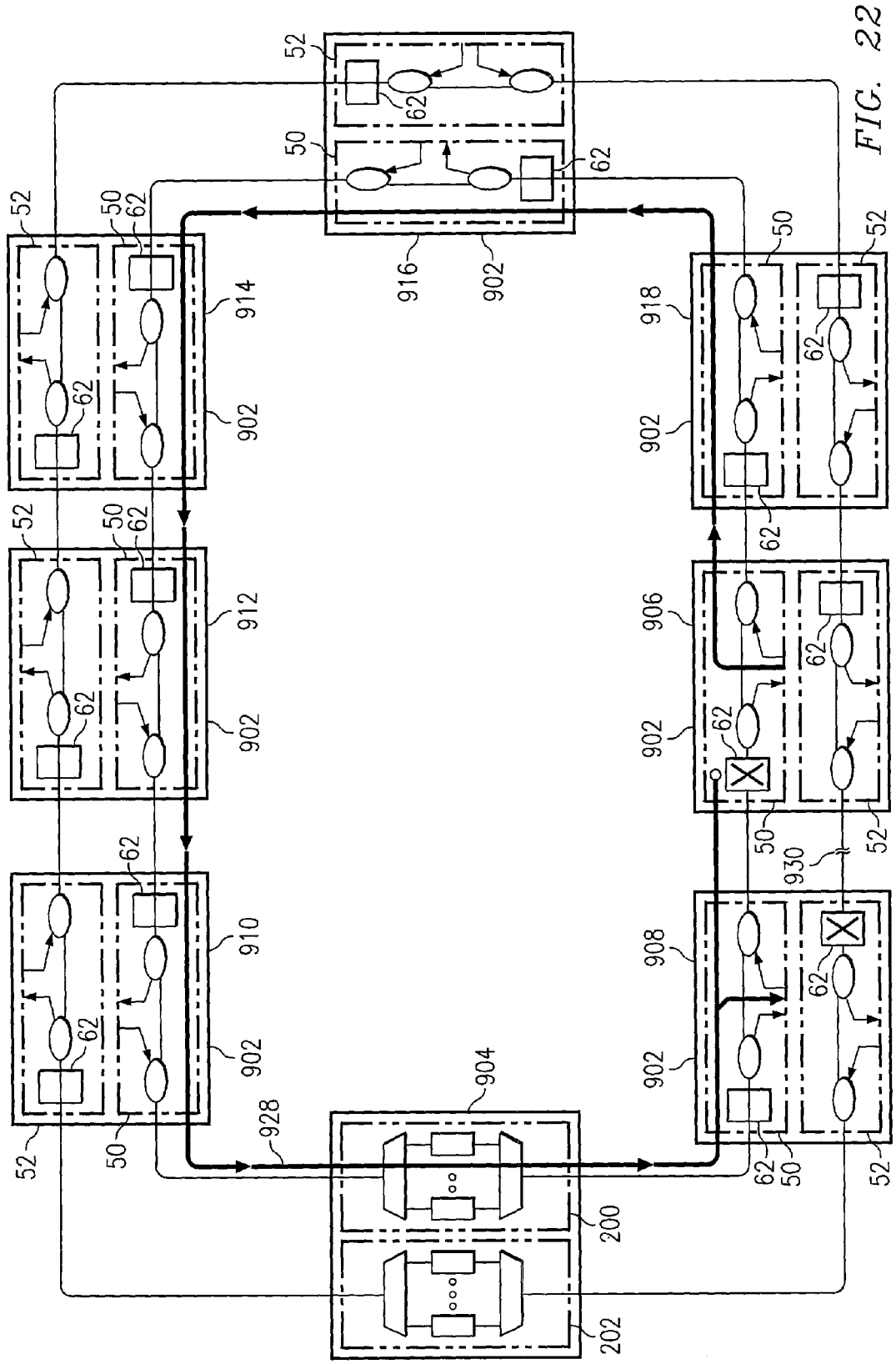
FIG. 22 is a block diagram illustrating protection switching of the optical network of FIG. 21 in accordance with one embodiment of the present invention.

FIG. 22 is a block diagram illustrating protection switching and light path protection of the working path of FIG. 21 in accordance with one embodiment of the present invention. Line cut 930 prevents traffic stream 928 as shown in FIG. 21 from reaching its destination node 908. Pursuant to the protection switching protocol, traffic corresponding to light path 926 is terminated. Switches 210 in hub node 904 corresponding to the wavelength of the ADN 928 traffic stream are closed, allowing the 928 traffic stream to pass through hub node 904. In this way, destination node 908 continues to receive the 928 traffic stream.

In order to ensure an opening in the rings 901 and 903, switch 62 in the transport element 50 of ADN 906 and switch 62 in the transport element 52 of ADN 908 are opened. In this way, channel interference is prevented, for example, if the line cut 930 only affects one ring, or during repair operations. After repair of the line cut, the network is reverted to its pre-protection switching state shown in FIG. 21.

Figure 23:
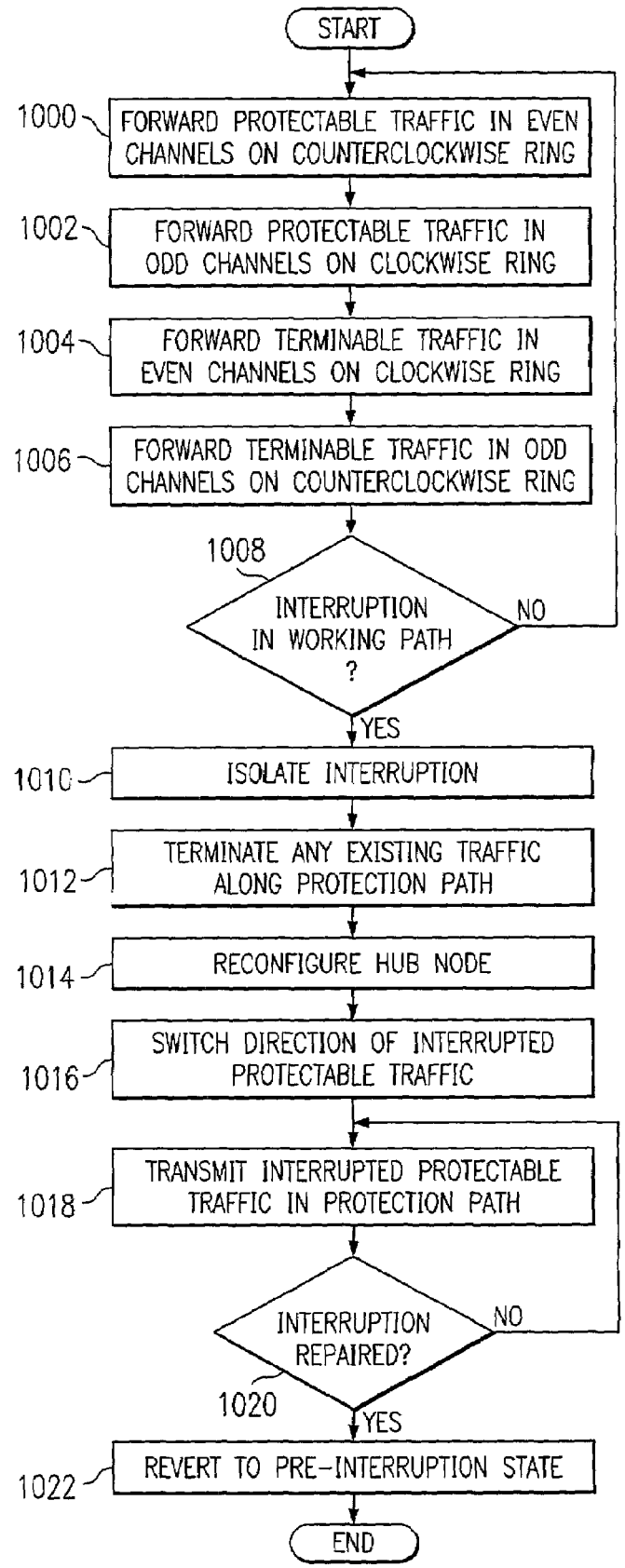
FIG. 23 is a flow diagram illustrating a method for protection switching in a hubbed passive optical ring network in accordance with one embodiment of the present invention.

FIG. 23 is a flow diagram illustrating a method for protection switching for the optical network of FIG. 10 in accordance with one embodiment of the present invention.

Referring to FIG. 23, the method begins with step 1000 wherein a first set of protectable traffic streams are forwarded in even channels in the counterclockwise ring. Proceeding to step 1002, a second set of protectable traffic streams are forwarded in odd channels on the clockwise ring. At step 1004, a first set of terminable traffic is forwarded in even channels in the clockwise ring, and, at step 1006, a second set of terminable traffic is forwarded in odd channels in the counterclockwise ring. In this way, each channel in each direction is occupied by a traffic stream, thus efficiently utilizing network capacity. In a particular embodiment, the protectable traffic streams are higher priority traffic streams for which a customer has paid a premium, whereas the terminable traffic streams are lower priority traffic streams.

At decisional step 1008, it is determined whether has been an interruption of a working path of a protectable traffic stream. Such interruption may comprise a line cut or other interruption that prevents the protectable traffic stream from reaching all of its destination nodes. If no interruption has occurred, the method returns to step 1000. If an interruption has occurred, then, at step 1010, the interruption is isolated. In a particular embodiment, the isolation of the interruption comprises opening the clockwise ring at the add/drop node clockwise of the interruption by opening the switch 62 in the clockwise transport element, and opening the counterclockwise ring at the add/drop node counterclockwise of the interruption by opening the switch 62 in the counterclockwise transport element.

Proceeding to step 1012, any existing, terminable traffic is terminated along the protection path. Terminable traffic may remain if the corresponding working path is not interfered with by a fiber cut or other interruption. At step 1014, the hub node is reconfigured to allow the protected traffic to proceed along the protection path. In a particular embodiment, this may be accomplished by closing the previously-opened switches 210 corresponding to that wavelength in the hub node.

Proceeding to step 1016, a switch in the DCE of the origination ADN of the interrupted traffic switches the direction of the interrupted traffic. At step 1018, the interrupted traffic is transmitted in the protection path. At decisional step 1020, it is determined whether the interruption has been repaired. If the interruption has not been repaired, the method returns to step 1018 and the interrupted traffic continues to be transmitted in the protection path. If the interruption has been repaired, the method proceeds to step 1022 wherein the network is reverted to its pre-interruption state, and the method has reached its end.

Although the present invention has been described with several embodiments, various changes and modifications may be suggested to one skilled in the art. It is intended that the present invention encompass such changes and modifications as fall within the scope of the appended claims.

What is claimed is:

1. An optical network, comprising:
   an optical ring;
   at least three subnets, each subnet comprising a subdivided portion of the optical ring and comprising a plurality of add/drop nodes coupled to the optical ring;
   the add/drop nodes operable to:
      forward a first set of protectable traffic streams in a first set of channels in a first direction on the optical ring;
      forward a second set of protectable traffic streams in a second set of channels in a second direction on the optical ring;
      forward a first set of terminable traffic streams in the second set of channels in the first direction; and
      forward a second set of terminable traffic streams in the first set of channels in the second direction, wherein the protectable traffic streams are higher priority traffic streams than the terminable traffic streams; and
   a plurality of gateway nodes, the gateway nodes each coupled to the optical ring at a different boundary between neighboring subnets so that there is a gateway node coupled at each boundary between neighboring subnets, each gateway node operable to selectively pass and terminate wavelengths between subnets to allow wavelength reuse in the subnets.

2. The optical network of claim 1, wherein the first direction is a counterclockwise direction and the second direction is a clockwise direction.

3. The optical network of claim 1, wherein the first set of channels comprises even-numbered channels and the second set of channels comprises odd-numbered channels.

4. The optical network of claim 1, wherein the add/drop nodes further comprise a combining element selectively operable to add traffic to the optical ring.

5. The optical network of claim 4, wherein the combining element is a divided combining element.

6. The optical network of claim 1, wherein the add/drop nodes further comprise a distributing element selectively operable to receive traffic from the optical ring.

7. The optical network of claim 6, wherein the distributing element is a divided distributing element.

8. The optical network of claim 1, wherein the ring comprises a first optical fiber forwarding traffic in the first direction and a second optical fiber forwarding traffic in the second direction.

9. A method of wavelength reuse, comprising:
providing an optical ring with at least three subnets, each subnet comprising a subdivided portion of the optical ring and comprising a plurality of add/drop nodes coupled to the optical ring;
forwarding a first set of protectable traffic streams in a first set of channels in a first direction on the optical ring;
forwarding a second set of protectable traffic streams in a second set of channels in a second direction on the optical ring;
forwarding a first set of terminable traffic streams in the second set of channels in the first direction;
forwarding a second set of terminable traffic streams in the first set of channels in the second direction, wherein the protectable traffic streams are higher priority traffic streams than the terminable traffic streams; and
at a plurality of gateway nodes each coupled to the optical ring at a different boundary between neighboring subnets so that there is a gateway node coupled at each boundary between neighboring subnets, selectively passing and terminating wavelengths between subnets to allow wavelength reuse in the subnets.

10. The method of claim 9, wherein the first direction is a counterclockwise direction and the second direction is a clockwise direction.

11. The method of claim 9, wherein the first set of channels comprises even-numbered channels and the second set of channels comprises odd-numbered channels.

12. The method of claim 9, wherein the add/drop nodes further comprise a combining element selectively operable to add traffic to the optical ring.

13. The method of claim 12, wherein the combining element is a divided combining element.

14. The method of claim 9, wherein the add/drop nodes further comprise a distributing element selectively operable to receive traffic from the optical ring.

15. The method of claim 14, wherein the distributing element is a divided distributing element.

16. The method of claim 9, wherein the ring comprises a first optical fiber forwarding traffic in the first direction and a second optical fiber forwarding traffic in the second direction.

17. A method of protection switching traffic carried on an optical network, the network comprising an optical ring operable to forward traffic in a first direction and in a second direction and further comprising and at least three subnets, each subnet comprising a subdivided portion of the optical ring and comprising a plurality of add/drop nodes coupled to the optical ring, the method comprising:
detecting an interruption in a working path of a protectable traffic stream forwarded in the first direction, the working path traversing at least part of a first subnet and comprising an origination node and a destination node;
terminating any existing traffic along a protection path in the same wavelength as the protectable traffic stream, the protection path traversing at least a second subnet, wherein the protectable traffic stream is higher priority traffic than the terminated traffic;
switching the direction of the protectable traffic stream from the first direction to the second direction; and
without changing the wavelength of the traffic, forwarding the protectable traffic stream in the protection path in the second direction to the destination node.

18. The method of claim 17, further comprising isolating the interruption.

19. The method of claim 17, further comprising reconfiguring at least one gateway comprising the boundary between the first subnet and the second subnet to allow the traffic to be forwarded in the protection path.

20. The method of claim 19, wherein reconfiguring the gateways comprises closing a switch element corresponding to the wavelength of the protectable traffic stream.

21. The method of claim 17, wherein the ring comprises a first optical fiber forwarding traffic in the first direction and a second optical fiber forwarding traffic in the second direction.

22. An optical network, comprising:
an optical ring with at least three subnets, each subnet comprising a subdivided portion of the optical ring and comprising a plurality of add/drop nodes coupled to the optical ring;
means for forwarding a first set of protectable traffic streams in a first set of channels in a first direction on the optical ring;
means for forwarding a second set of protectable traffic streams in a second set of channels in a second direction on the optical ring;
means for forwarding a first set of terminable traffic streams in the second set of channels in the first direction;
means for forwarding a second set of terminable traffic streams in the first set of channels in the second direction, wherein the protectable traffic streams are higher priority traffic streams than the terminable traffic streams; and
means for, at a plurality of gateway nodes each coupled to the optical ring at a different boundary between neighboring subnets so that there is a gateway node coupled at each boundary between neighboring subnets, selectively passing and terminating wavelengths between subnets to allow wavelength reuse in the subnets.

23. The optical network of method of claim 22, wherein the first direction is a counterclockwise direction and the second direction is a clockwise direction.

24. The optical network of claim 23, wherein the first set of channels comprises even-numbered channels and the second set of channels comprises odd-numbered channels.

25. The optical network of claim 22, wherein the add/drop nodes further comprise means for selectively adding traffic to the optical ring.

26. The optical network of claim 25, wherein the means for selectively adding traffic comprises a divided combining element.

27. The optical network of claim 22, wherein the add/drop nodes further comprise means for selectively receiving traffic from the optical ring.

28. The optical network of claim 27, wherein the means for selectively receiving traffic comprises a divided distributing element.

29. The optical network of claim 22, wherein the ring comprises a first optical fiber forwarding traffic in the first direction and a second optical fiber forwarding traffic in the second direction.

30. An optical network, comprising:
an optical ring operable to forward traffic in a first direction and in a second direction and further comprising and at least three subnets, each subnet comprising a subdivided portion of the optical ring and comprising a plurality of add/drop nodes coupled to the optical ring:
means for detecting an interruption in a working path of a protectable traffic stream forwarded in the first direction, the working path traversing at least part of a first subnet and comprising an origination node and a destination node;
means for terminating any existing traffic along a protection path in the same wavelength as the protectable traffic stream, the protection path traversing at least a second subnet, wherein the protectable traffic stream is higher priority traffic than the terminated traffic;
means for switching the direction of the protectable traffic stream from the first direction to the second direction; and
means for, without changing the wavelength of the traffic, forward the protectable traffic stream in the protection path in the second direction to the destination node.

31. The optical network of claim 30, further comprising means for isolating the interruption.

32. The optical network of claim 31, further comprising means for reconfiguring at least one gateway comprising the boundary between the first subnet and the second subnet to allow the traffic to be forwarded in the protection path.

33. The optical network of claim 32, wherein the means for reconfiguring the gateways comprises closing a switch element corresponding to the wavelength of the protectable traffic stream.

34. The optical network of claim 30, wherein the ring comprises a first optical fiber forwarding traffic in the first direction and a second optical fiber forwarding traffic in the second direction.

* * * * *

UNITED STATES PATENT AND TRADEMARK OFFICE
CERTIFICATE OF CORRECTION

PATENT NO. : 7,283,739 B2  Page 1 of 1
APPLICATION NO. : 10/158348
DATED : October 16, 2007
INVENTOR(S) : Susumu Kinoshita et al.

It is certified that error appears in the above-identified patent and that said Letters Patent is hereby corrected as shown below:

Column 1, Line 22, before "to increase" delete "(WDM)" and insert -- (DWDM) --.

Signed and Sealed this

Twenty-first Day of October, 2008

JON W. DUDAS
*Director of the United States Patent and Trademark Office*